US012500998B2

(12) United States Patent
Fukai et al.

(10) Patent No.: US 12,500,998 B2
(45) Date of Patent: Dec. 16, 2025

(54) DATA PROCESSING DEVICE, DATA PROCESSING METHOD, AND DATA PROCESSING PROGRAM

(71) Applicant: NTT, Inc., Tokyo (JP)

(72) Inventors: Misa Fukai, Tokyo (JP); Masashi Tadokoro, Tokyo (JP); Haruo Oishi, Tokyo (JP)

(73) Assignee: NTT, Inc., Tokyo (JP)

( * ) Notice: Subject to any disclaimer, the term of this patent is extended or adjusted under 35 U.S.C. 154(b) by 266 days.

(21) Appl. No.: 18/038,946

(22) PCT Filed: Nov. 27, 2020

(86) PCT No.: PCT/JP2020/044380
§ 371 (c)(1),
(2) Date: May 25, 2023

(87) PCT Pub. No.: WO2022/113307
PCT Pub. Date: Jun. 2, 2022

(65) Prior Publication Data
US 2023/0421724 A1    Dec. 28, 2023

(51) Int. Cl.
*H04N 7/15*     (2006.01)
*G06F 3/04817*  (2022.01)
*G06F 3/16*     (2006.01)

(52) U.S. Cl.
CPC .......... *H04N 7/15* (2013.01); *G06F 3/04817* (2013.01); *G06F 3/165* (2013.01)

(58) Field of Classification Search
CPC ...... H04N 7/15; H04N 7/157; G06F 3/04817; G06F 3/165; G06F 3/04847; G06F 13/00
See application file for complete search history.

(56) References Cited

U.S. PATENT DOCUMENTS

2015/0378531 A1*  12/2015  Bansal ................. H04L 65/403
                                              348/14.03

FOREIGN PATENT DOCUMENTS

JP    2018036871    *  3/2018  ............. G06F 13/00

OTHER PUBLICATIONS

Remo.co (2020) "Remo" literature [online] Accessed on Sep. 14, 2020, website: https://remo.co/.
SpatialChat Ltd. (2020) "Spatial Chat" literature [online] Accessed on Sep. 29, 2020, website: https://spatial.chat.
Shiho Yastunami (2020) "Visualize presence with "Remo" Eliminate remote loneliness" Mynavi Publishing Corporation, Web Designing, vol. 203, No. Aug. 2020, pp. 50-53.

(Continued)

*Primary Examiner* — Yosef K Laekemariam

(57) ABSTRACT

A data processing device (100) creates space information imitating an office environment having a plurality of rooms. The data processing device (100) displays the space information in which a plurality of icons corresponding to a plurality of users is arranged in a plurality of rooms on the basis of instruction information from each of terminal devices used by the plurality of users. For a room in which a plurality of icons is displayed in the space information, the data processing device (100) establishes a call by connecting a plurality of terminal devices corresponding to the plurality of icons displayed in the room.

12 Claims, 25 Drawing Sheets

(56) References Cited

OTHER PUBLICATIONS

Mariko Murakami (2020) "Part3 A new way of working after telework Towards an era of "going to work" in a virtual space" Telecommunication, vol. 37, No. 6, pp. 16-19.

Hirata et al. (2007) "Development and Evaluation of Situation Information Sharing System Based on User's Permission-based Privacy" Transactions of Information Processing Society of Japan, vol. 48, No. 1, pp. 189-199.

Yuki Kai (2020) "Completely different from Zoom drinking parties! SpatialChat introduces distance to online drinking parties" Internet Watch [online] May 15, 2020, website: https://internet.watch.impress.co.jp/docs/review/1252198.html.

* cited by examiner

DATA PROCESSING DEVICE, DATA PROCESSING METHOD, AND DATA PROCESSING PROGRAM

CROSS-REFERENCE TO RELATED APPLICATIONS

This application is a U.S. National Stage Application filed under 35 U.S.C. § 371 claiming priority to International Patent Application No. PCT/JP2020/044380, filed on 27 Nov. 2020, the disclosure of which is hereby incorporated herein by reference in its entirety.

TECHNICAL FIELD

The present invention relates to a data processing device, a data processing method, and a data processing program.

BACKGROUND ART

The spread of telework has expanded as a measure against infectious disease. In telework, a chat, a telephone, and a web conference system are used as communication tools. However, in communication using these tools, it is not possible to visually confirm the state of another person, and thus it is difficult to grasp the situation of another person. In addition, there are problems that a person feels resistance to the act of talking to another person and has no opportunity to start a conversation as compared with a case where the persons are in the same space (office). Due to these problems, in non-face-to-face communication, the amount of communication is often reduced as compared with face-to-face communication, which may lead to weakening of a reliability relationship and deterioration of productivity.

Here, in order to enrich communication in telework, there are a system in which a web conference venue having a plurality of rooms is created on a graphical user interface (GUI) and a conversation is made in each room to realize a conversation with a small number of people even in a web conference in which a large number of people participate (see Non Patent Literature 1), and a system in which participants are represented as icons on a GUI, a large voice is heard when the distance between the icons is short, and a small voice is heard when the distance is long (see Non Patent Literature 2).

CITATION LIST

Non Patent Literature

Non Patent Literature 1: "remo", [online], 2020, [retrieved on Sep. 29, 2020], Internet <URL:https://remo.co/>
Non Patent Literature 2: "Spatial Chat", [online], 2020, [retrieved on Sep. 29, 2020], Internet <URL:https://spatial.chat/>

SUMMARY OF INVENTION

Technical Problem

In order to perform, in a telework environment, communication equivalent to that in an office environment, it is optimal to reproduce an office environment in which the situations of surrounding people can be grasped and a person can easily talk to another person. However, is a case where communication is performed by use of a web conference system, an online work space, a chat tool, or the like, it is difficult to reproduce the office environment because information for determining the state of a user includes only voice, video, and text, which makes a difference in acquirable information, and a problem of a call environment due to an influence of a communication delay cannot be solved. Therefore, there is inevitably a gap between communication environments of office work and telework, such as a difference in acquirable information or a call environment.

That is, it is required to perform realistic communication imitating an environment in which a plurality of users works in the same office.

The present invention has been made in view of the above, and an object thereof is to provide a data processing device, a data processing method, and a data processing program capable of performing realistic communication imitating an environment in which a plurality of users works in the same office.

Solution to Problem

In order to solve the above-described problems and achieve the object, a data processing device according to the present invention includes: a creation unit that creates space information imitating an office environment having a plurality of rooms; a display unit that displays the space information in which a plurality of icons corresponding to a plurality of users is arranged in the plurality of rooms on a basis of instruction information from each of terminal devices used by the plurality of users; and a calling unit that establishes a call by connecting, for a room in which a plurality of icons is displayed in the space information, a plurality of terminal devices corresponding to the plurality of icons displayed in the room.

Advantageous Effects of Invention

According to the present invention, it is possible to perform realistic communication imitating an environment in which a plurality of users works in the same office.

DESCRIPTION OF EMBODIMENTS

Hereinafter, examples of a data processing device, a data processing method, and a data processing program disclosed in the present application will be described in detail with reference to the drawings. Note that the present invention is not limited by the examples.

Example 1

Figure 1:
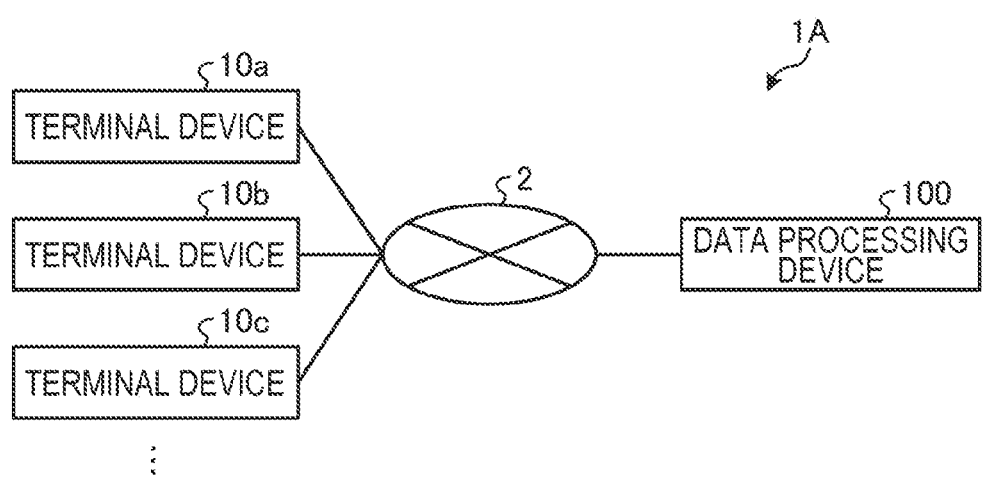
FIG. 1 is a diagram illustrating a configuration of a system according to Example 1.

FIG. 1 is a diagram illustrating a configuration of a system according to Example 1. As illustrated in FIG. 1, a system 1A includes terminal devices 10a, 10b, and 10c and a data processing device 100. Although the terminal devices 10a to 10c and the data processing device 100 are illustrated in the system 1A, the system 1A may further include another terminal device and another data terminal device.

In the following description, the terminal devices 10a to 10c and another terminal device are collectively referred to as terminal devices 10 unless otherwise specified. Note that the data processing device 100 does not need to be a device physically separate from the terminal devices 10, and may be a part of the terminal devices 10. Furthermore, functional units in the data processing device 100 may not be physically in the same device, and in particular, a part of the functional units may be disposed as a part of the terminal devices 10.

The terminal devices 10 and the data processing device 100 are connected to each other via a network 2.

Each of the terminal devices 10 is a terminal device used by a user to execute communication, and corresponds to a smartphone, a tablet terminal, a notebook personal computer (PC), or the like. One terminal device 10 executes data communication with the data processing device 100 and another terminal device 10 with which a call has been established via the network 2.

The data processing device 100 creates space information imitating an office environment having a plurality of rooms, and displays the space information (office user interface (UI)) in which a plurality of icons corresponding to a plurality of users is arranged in the plurality of rooms on the basis of instruction information received from each of the terminal devices 10 used by the plurality of users. Here, for each room in which a plurality of icons is displayed on the office UI, the data processing device 100 establishes a call by connecting a plurality of terminal devices corresponding to a plurality of icons displayed in the same room.

For example, in a case where an icon of a user of the terminal device 10a and an icon of a user of the terminal device 10b are arranged in the same room on the office UI, the data processing device 100 establishes a call between the terminal device 10a and the terminal device 10b.

As described above, the data processing device 100 displays the office UI on which the icons corresponding to the plurality of users are arranged, so that it is possible to virtually provide one space where users in spaces separated in reality exist together. Furthermore, since a call is established on the basis of icons arranged in the same room, it is possible to perform realistic communication imitating an environment in which a plurality of users works in the same office.

Figure 2:
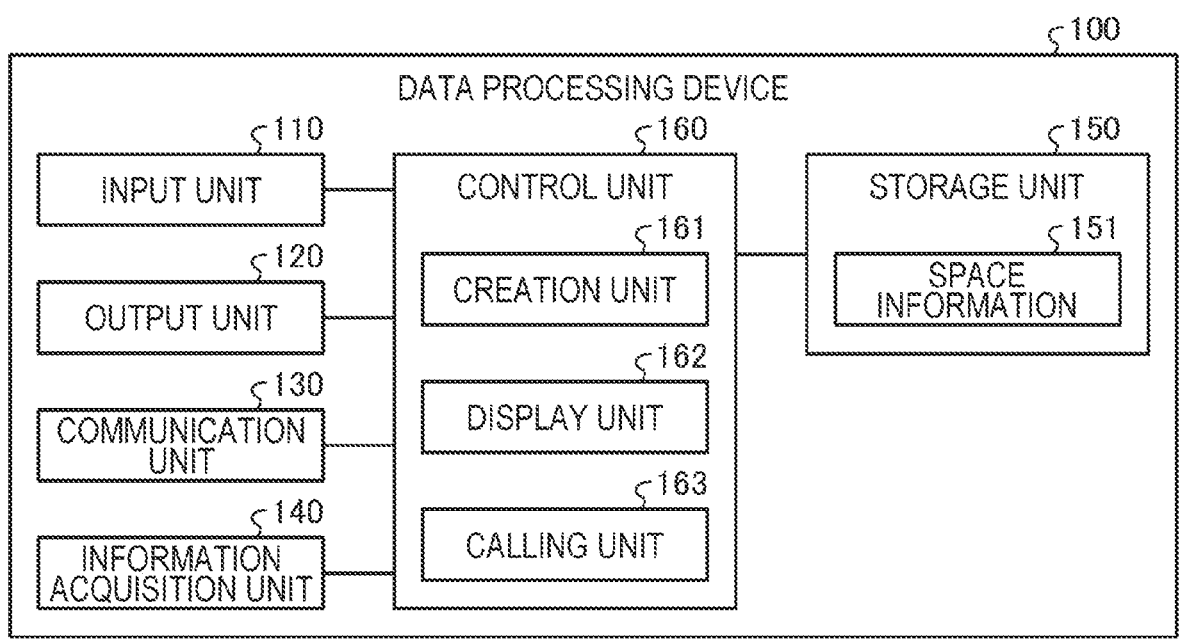
FIG. 2 is a functional block diagram illustrating a configuration of a data processing device according to Example 1.

Next, a configuration example of the data processing device according to Example 1 will be described. FIG. 2 is a functional block diagram illustrating a configuration of the data processing device according to Example 1. As illustrated in FIG. 2, the data processing device 100 includes an input unit 110, an output unit 120, a communication unit 130, an information acquisition unit 140, a storage unit 150, and a control unit 160.

The input unit 110 is an input interface that receives various operations from an operator of the data processing device 100. For example, the input unit 110 includes an input device such as a keyboard or a mouse.

The output unit 120 is an output device that outputs information acquired from the control unit 160, and is implemented by a display device such as a liquid crystal display, a printing device such as a printer, or the like.

The communication unit 130 is a communication interface that transmits and receives various types of information to and from the terminal devices 10 and other devices connected via the network 1 or the like. The communication unit 130 is implemented by a network interface card (NIC) or the like, and performs communication between the control unit 160 and the terminal devices 10 and other devices via an electric communication line such as a local area network (LAN) or the Internet.

The communication unit 130 receives information regarding an operation performed on each of the terminal devices 10 by a user and information regarding the state of the user via the network, and outputs the information to the control unit 160.

The information acquisition unit 140 acquires, from each of the terminal devices 10, video information captured by a camera of each of the terminal devices 10 and voice information collected by a microphone of each of the terminal devices 10, and outputs the acquired information to the control unit 160.

The storage unit 150 is implemented by a semiconductor memory element such as a random access memory (RAM) or a flash memory or a storage device such as a hard disk or an optical disk. In Example 1, the storage unit 150 stores space information 151.

The space information 151 is information regarding an office UI created by a creation unit 161 that has received an input operation of an administrator or the like of the data processing device 100, and includes the number and size of rooms in an office and information (positional relationship or the like) on chairs, desks, and the like arranged in the rooms. Furthermore, as described later, various functions are set in the rooms, the desks, and the chairs. Note that the space information 151 may hold information regarding a plurality of types of office UIs. The information on each office UI is identified by an office ID or the like.

Figure 3:
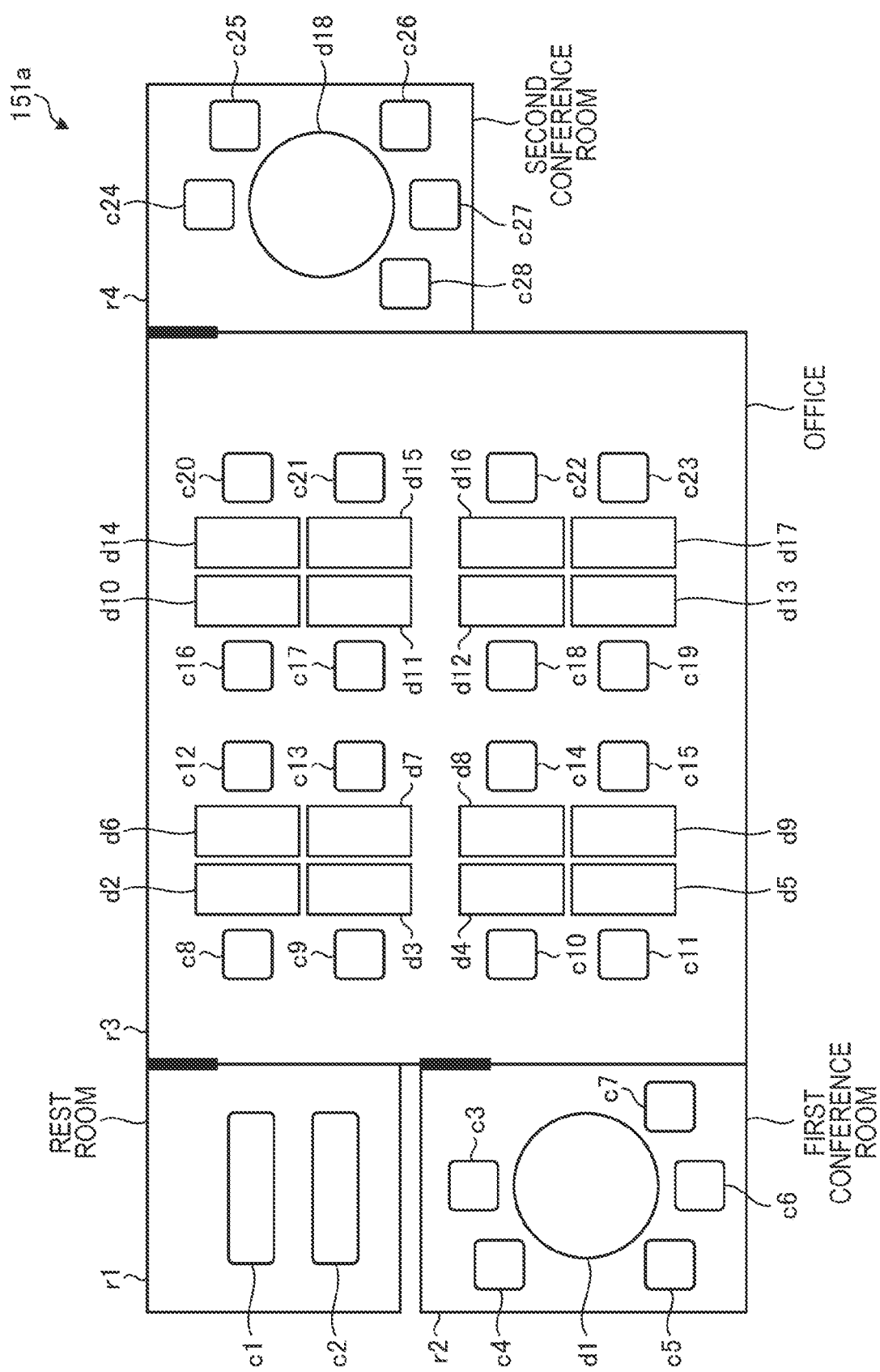
FIG. 3 is a diagram illustrating an example of an office UI.

FIG. 3 is a diagram illustrating an example of an office UI. As illustrated in FIG. 3, an office UI 151a includes rooms r1, r2, r3, and r4, and desks and chairs are arranged in each of the rooms r1 to r4.

For example, the room r1 corresponds to a rest room. In the room r1, chairs c1 and c2 are arranged. The room r2 corresponds to a first conference room. In the room r2, chairs c3, c4, c5, c6, and c7, and a desk d1 are arranged.

The room r3 corresponds to an office. In the room r3, chairs c8, c9, c10, c11, c12, c13, c14, c15, c16, c17, c18, c19, c20, c21, c22, and c23 are arranged. Furthermore, in the room r3, desks d2, d3, d4, d5, d6, d7, d8, d9, d10, d11, d12, d13, d14, d15, d16, and d17 are arranged.

The room r4 corresponds to a second conference room. In the room r4, chairs c24, c25, c26, 27, and c28, and a desk d18 are arranged.

In the following description, the rooms r1 to r4 included in the office UI 151a are referred to as "rooms" unless otherwise specified. The chairs c1 to c28 are referred to as "chairs". The desks d1 to d18 are referred to as "desks".

The description returns to FIG. 2. The control unit 160 is implemented by use of a central processing unit (CPU) or the like, and executes a processing program stored in a memory. As a result, the control unit 160 functions as the creation unit 161, a display unit 162, and a calling unit 163.

The creation unit 161 executes processing of creating the space information 151. For example, the creation unit 161 creates the space information 151 on the basis of input information of the administrator who operates the input unit 110.

Figure 4:
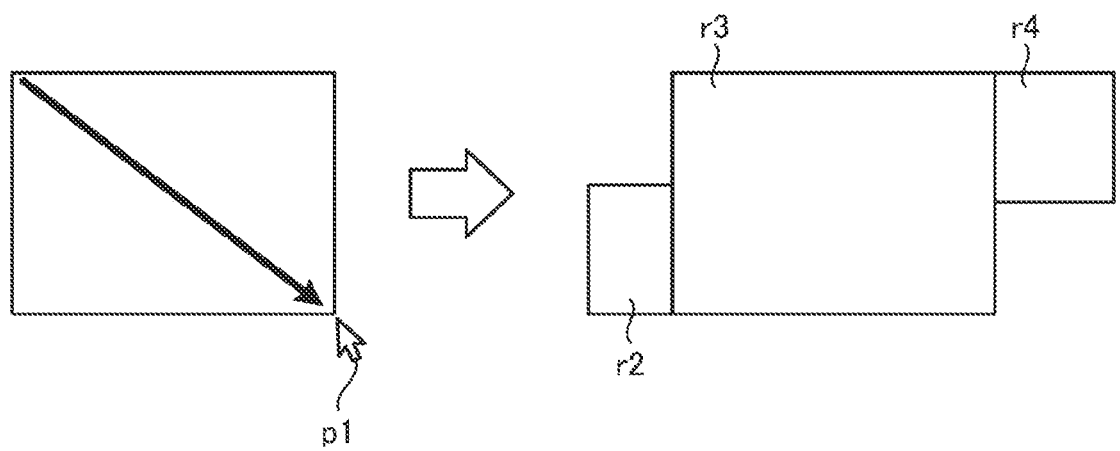
FIG. 4 is a diagram (1) for describing processing of a creation unit.
Figure 5:
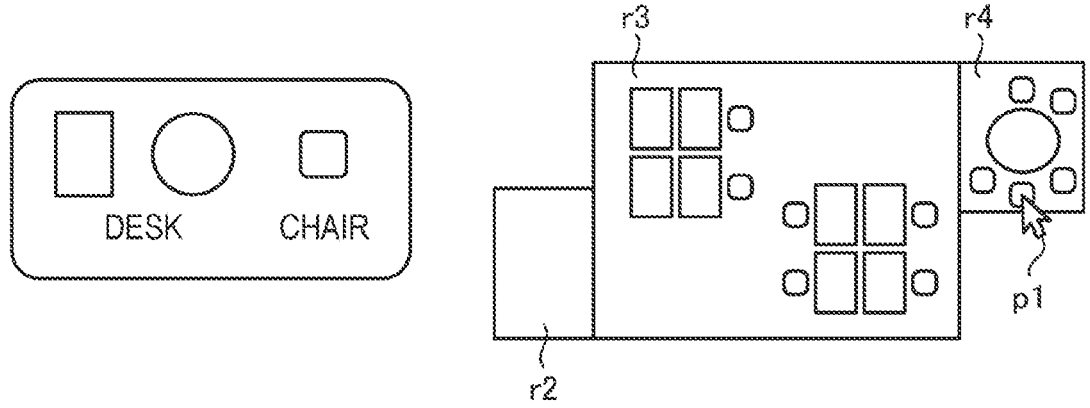
FIG. 5 is a diagram (2) for describing the processing of the creation unit.

FIGS. 4 and 5 are diagrams for describing the processing of the creation unit. FIG. 4 will be described. With the input unit 110, the administrator performs a click operation and a drag operation with a pointer p1 to indicate the size of each room in the office. In the example illustrated in FIG. 4, the creation unit 161 generates the rooms r2, r3, and r4 on the basis of an instruction via the input unit 110.

FIG. 5 will be described. With the input unit 110, the administrator performs a drag-and-drop operation with the pointer p1 to arrange chairs and desks in each room in the office. In the example illustrated in FIG. 5, the creation unit 161 displays icons of the chairs and the desks on the display (output unit 120), and the administrator performs a drag-and-drop operation on the icons of the chairs and the desks with the input unit 110.

The creation unit 161 gives functions and roles to the rooms and the objects on the basis of an input from the administrator who operates the input unit 110. For example, the creation unit 161 gives a role such as a conference room or a rest room to each room. Giving these roles makes it possible to easily determine the current situation of a user according to the room in which an icon of the user is arranged.

The creation unit 161 gives a function of locking the rooms such that only a permitted user can enter the rooms. As a result, information leakage can be prevented.

The creation unit 161 gives a function of assigning one or a plurality of users to a desk arranged in a room and setting a home position of the user. As a result, it is possible to easily determine the state of each user, such as being absent from work or being away from his/her seat.

The creation unit 161 may create a temporary room. As a result, it is possible to temporarily create a pseudo conference room that does not exist in a real office and cope with a case where conference rooms are insufficient.

As described above, the creation unit 161 creates the space information 151 on the basis of the input information of the administrator who operates the input unit 110, and stores the space information 151 in the storage unit 150.

Incidentally, the creation unit 161 may automatically create the space information 151 on the basis of layout information or image information of a real office. For example, with an object detection technique, the creation unit 161 reads the sire and number of rooms in the office, and information (positional relationship or the like) on objects (desks and chairs) arranged in the rooms from the layout information or the image information of the office. The creation unit 161 creates the space information 151 on the basis of the read information on the office.

Furthermore, the creation unit 161 may generate the space information 151 using a learned generation model. With the input unit 110, the administrator inputs feature information such as the number of rooms and the number of objects in an office. The creation unit 161 inputs the input feature information to the generation model and obtains an output result (space information 151) from the generation model. For example, the generation model corresponds to a generative adversarial network (GAN) or the like.

The display unit 162 generates the office UI 151a described with reference to FIG. 3 on the basis of the space information 151, and transmits information on the office UI 151a to the terminal devices 10 to display the information. Users of the terminal devices 10 refer to the office UI 151a displayed on the terminal devices 10, and operate the terminal devices 10 to indicate the positions of the users. The terminal devices 10 transmit instruction information indicated by the users to the data processing device 100. The instruction information includes identification information for identifying the terminal devices and the users, and position information of the users on the office UI 151a.

When receiving the instruction information from the terminal devices 10, the display unit 162 arranges icons corresponding to the users on the office UI 151a on the basis of the instruction information, and transmits information on the office UI 151a on which the icons are arranged to the terminal devices 10 to display the information. The display unit 162 updates the office UI 151a and the icons in real time on the basis of the instruction information transmitted from the terminal devices 10.

Figure 6:
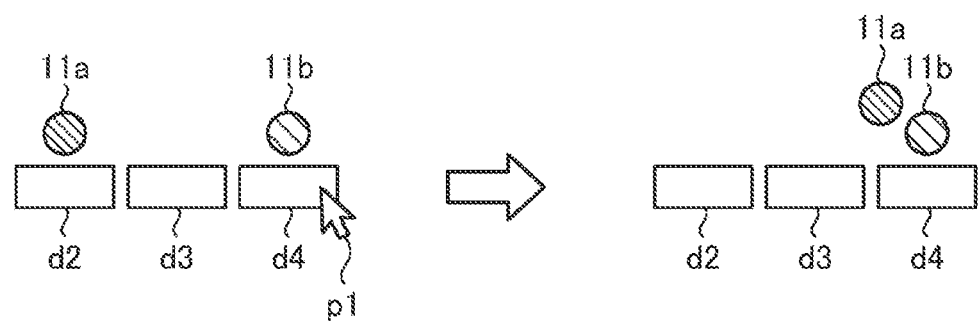
FIG. 6 is a diagram (1) for describing an example of movement of an icon.
Figure 7:
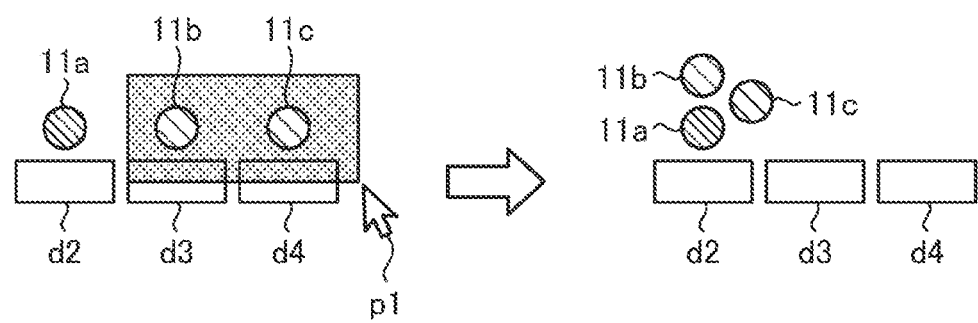
FIG. 7 is a diagram (2) for describing an example of movement of an icon.

Here, each of the users of the terminal devices 10 moves the icon representing the user to a desired position on the office UI 151a by a click operation or the like. FIGS. 6 and 7 are diagrams for describing an example of movement of an icon.

FIG. 6 will be described. For example, an icon corresponding to a user A of the terminal device 10a is an icon 11a, and an icon corresponding to a user B of the terminal device 10b is an icon 11b. The user A performs a click operation on the desk d4 using the terminal device 10a. When receiving instruction information related to the click operation from the terminal device 10a, the display unit 162 shifts the icon 11a to the desk d4.

FIG. 7 will be described. For example, the icon corresponding to the user A of the terminal device 10a is the icon 11a, the icon corresponding to the user B of the terminal device 10b is the icon 11b, and an icon corresponding to a user C of the terminal device 10c is an icon 11c. The user A performs a drag-and-drop operation on the icons 11b and 11c using the terminal device 10a. When receiving instruction information related to the drag-and-drop operation from the terminal device 10a, the display unit 162 shifts the icons 11b and 11c to the desk d2.

The display unit 162 outputs information regarding the positions of the icons of the users on the office UI 151a to the calling unit 163 while executing the above processing according to the instruction information from the terminal devices 10. For example, it is assumed that the identification information of the users and the terminal devices is associated with the icons.

The calling unit 163 specifies a set of terminal devices 10 to establish a call on the basis of the information acquired from the display unit 162, and establishes the call between the specified terminal devices 10. For example, the calling unit 163 scans each room, specifies rooms in each of which a plurality of icons is arranged, and starts a call for each room in which a plurality of icons is arranged.

Figure 8:
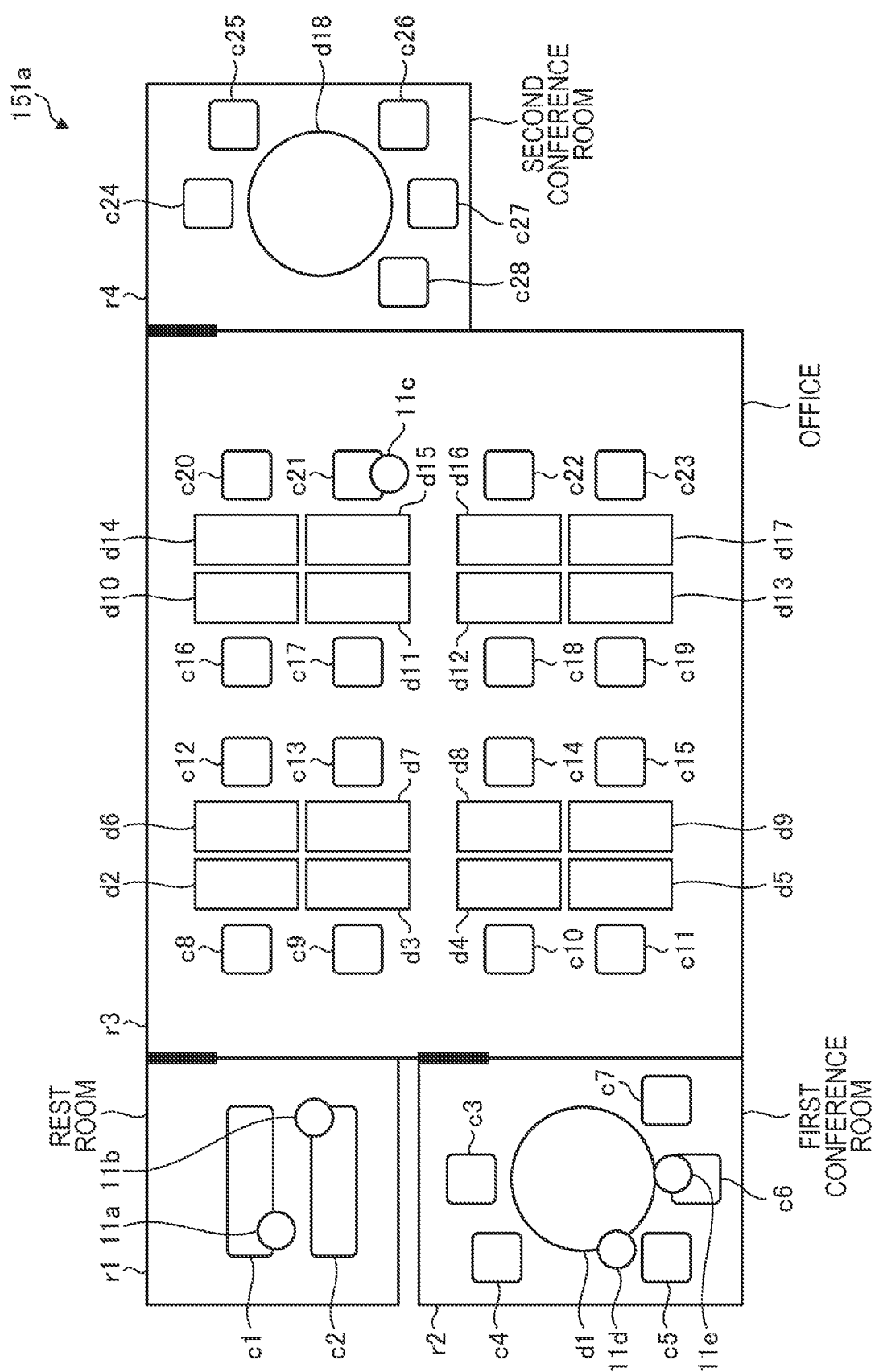
FIG. 8 is a diagram for describing processing of a calling unit according to Example 1.

FIG. 8 is a diagram for describing processing of the calling unit according to Example 1. In the example illustrated in is FIG. 8, in the room r1, the icons 11a and 11b are arranged in the room r2, an icon 11d is arranged. In the room r3, the icon 11c is arranged.

The user of the icon 11a is a user of the terminal device 10a. The user of the icon 11b is a user of the terminal device 10b. The user of the icon 11c is a user of the terminal device 10c. The user of the icon 11d is a user of a terminal device 10d. The user of the icon 11e is a user of a terminal device 10e. In FIG. 1, the terminal devices 10d and 10e are not illustrated.

In FIG. 8, since the plurality of icons 11a and 11b is arranged in the room r1, the calling unit 163 establishes a call between the terminal device 10a and the terminal device 10b. For example, the calling unit 163 establishes the call by transmitting video information and voice information acquired from the terminal device 10a to the terminal device 10b and transmitting video information and voice information acquired from the terminal device 10b to the terminal device 10a.

Since the plurality of icons 11d and 11e is arranged in the room r2, the calling unit 163 establishes a call between the terminal device 10d and the terminal device 10e. For example, the calling unit 163 establishes the call by transmitting video information and voice information acquired from the terminal device 10d to the terminal device 10e and transmitting video information and voice information acquired from the terminal device 10e to the terminal device 10d.

Figure 9:
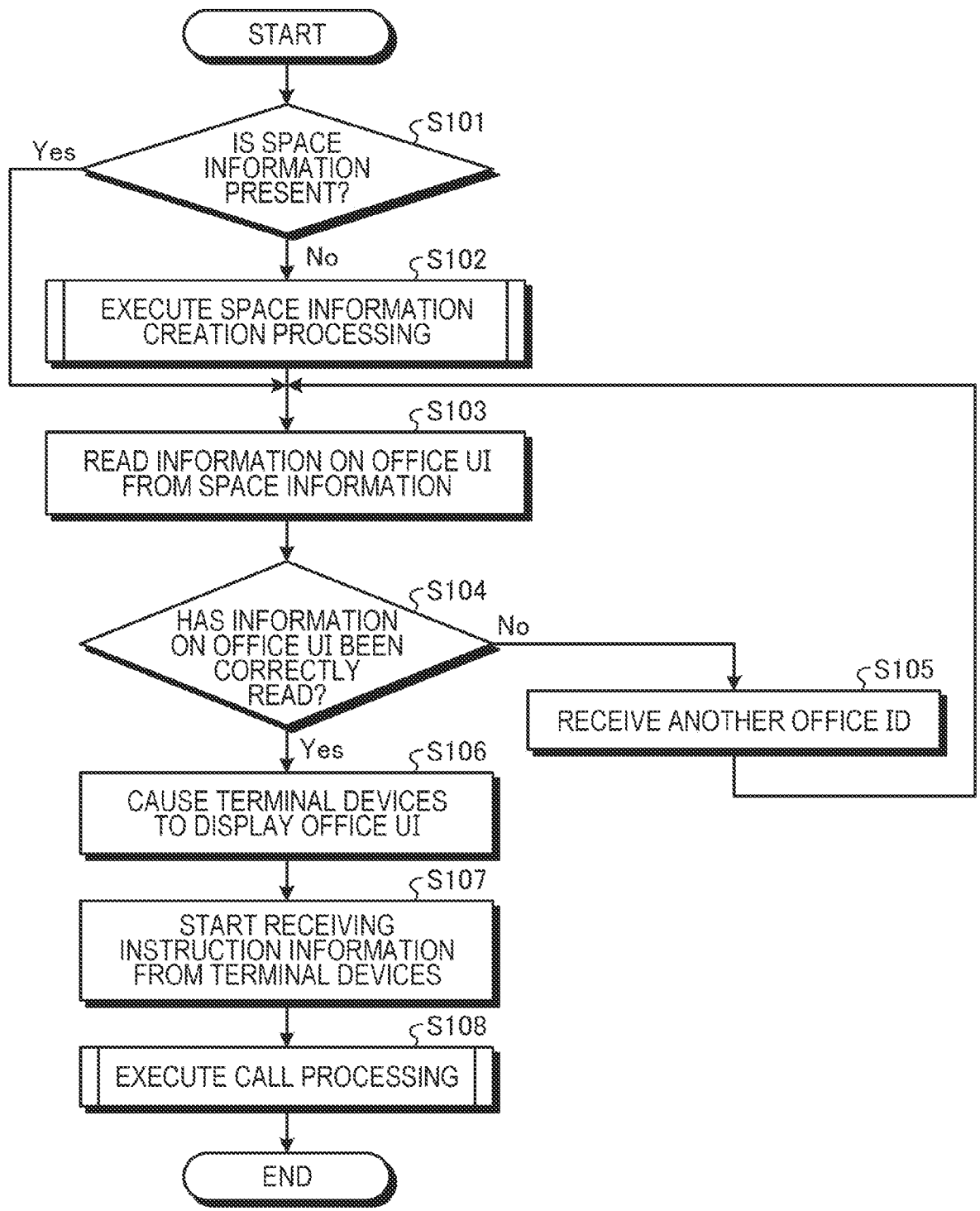
FIG. 9 is a flowchart illustrating a processing procedure of the data processing device according to Example 1.

Next, an example of a processing procedure of the data processing device 100 according to Example 1 will be described. FIG. 9 is a flowchart illustrating the processing procedure of the data processing device according to Example 1. As illustrated in FIG. 9, in a case where the space information 151 is present (step S101, Yes), the data processing device 100 proceeds to step S103. On the other hand, in a case where the space information 151 is not present (step S101, No), the data processing device 100 proceeds to step S102.

The creation unit 161 of the data processing device 100 executes space information creation processing (step S102). The display unit 162 of the data processing device 100 reads information on an office UI from the space information 151 (step S103). In a case where the information on the office UI is not correctly read (step S104, No), the display unit 162 receives another office ID (step S105) and proceeds to step S103.

In a case where the information on the office UI has been correctly read (step S104, Yes), the display unit 162 proceeds to step S106. The display unit 162 causes the terminal devices 10 to display the office UI (step S106). The display unit 162 starts receiving instruction information of instruction information from the terminal devices 10 (step S107). The calling unit 163 of the data processing device 100 executes call processing (step S108).

Figure 10:
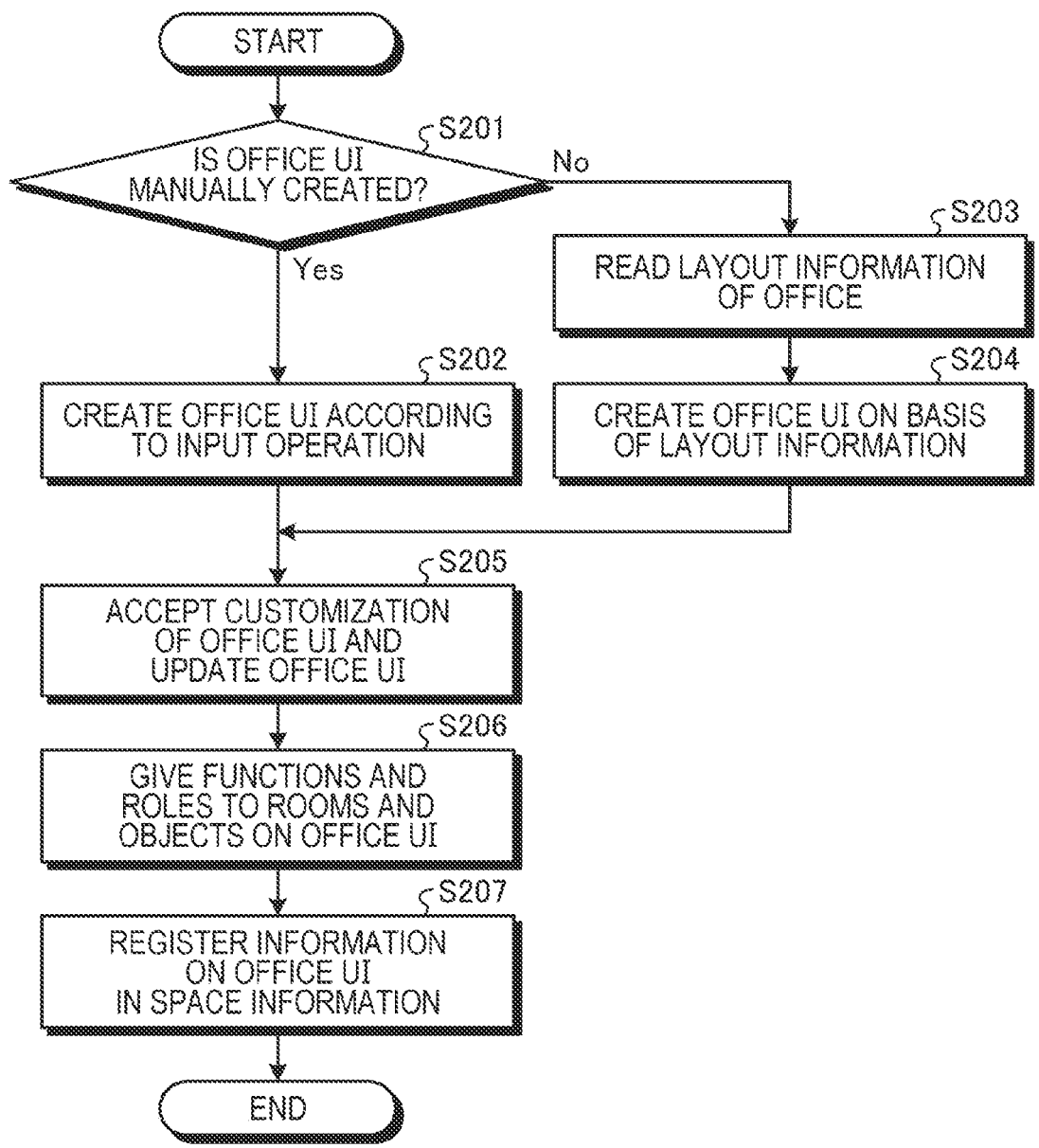
FIG. 10 is a flowchart illustrating a processing procedure of space information creation processing.

Next, an example of a processing procedure of the space information creation processing described in step S102 of FIG. 9 will be described. FIG. 10 is a flowchart illustrating the processing procedure of the space information creation processing. As illustrated in FIG. 10, in a case where the office UI is manually created (step S201, Yes), the creation unit 161 of the data processing device 100 creates the office UI according to an input operation input from the input unit 110 (step S202), and proceeds to step S205.

On the other hand, in a case where the office UI is not manually created (step S201, No), the creation unit 161 reads layout information (or image information) of an office (step S203). The creation unit 161 creates the office UI on the basis of the layout information (step S204), and proceeds to step S205.

The creation unit 161 accepts customization of the office UI and updates the office UI (step S205). In step S206, the customization accepted by the creation unit 161 corresponds to arrangement or deletion of a room or an object (a desk, a chair, or the like).

The creation unit 161 gives functions and roles to rooms and objects on the office UI (step S206). The creation unit 161 registers the information on the office UI in the space information 151 (step S207).

Figure 11:
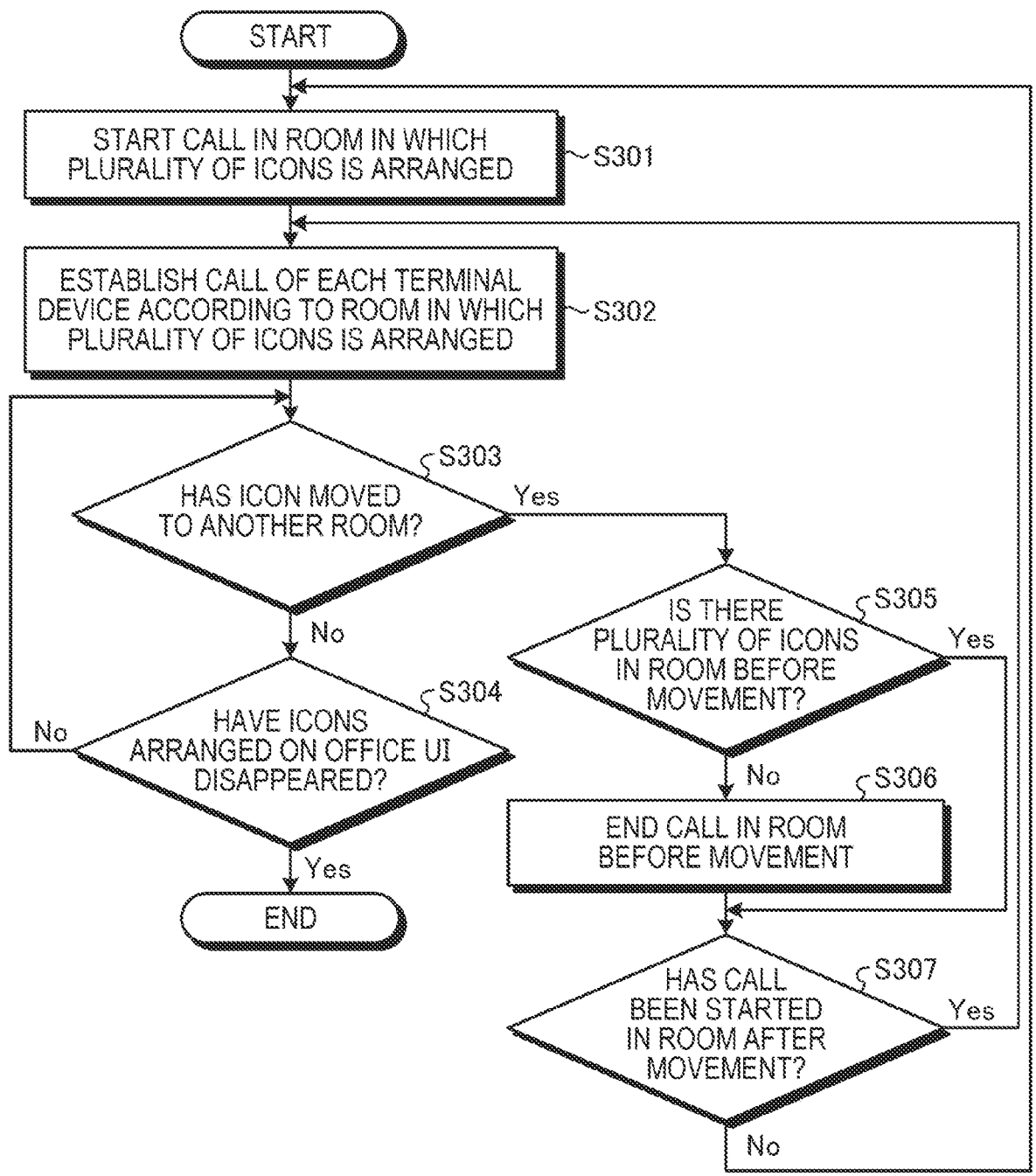
FIG. 11 is a flowchart illustrating a processing procedure of call processing.

Next, an example of a processing procedure of the call processing described in step S108 of FIG. 9 will be described. FIG. 11 is a flowchart illustrating the processing procedure of the call processing. As illustrated in FIG. 11, the calling unit 163 of the data processing device 100 starts a call in a room in which a plurality of icons is arranged (step S301).

The calling unit 163 establishes a call of each terminal device according to the room in which the plurality of icons is arranged (step S302). In a case where an icon has moved to another room on the office UI (step S303, Yes), the calling unit 163 proceeds to step S305. In a case where an icon has not moved to another room on the office UI (step S303, No), the calling unit 163 proceeds to step S304.

In a case where the icons arranged on the office UI have disappeared (step S304, Yes), the calling unit 163 ends the call processing. In a case where the icons arranged on the office UI have not disappeared (step S304, No), the calling unit 163 proceeds to step S303.

In a case where there is a plurality of icons in the room before the movement (step S305, Yes), the calling unit 163 proceeds to step S307. On the other hand, in a case where there is no plurality of icons in the room before the movement (step S305, No), the calling unit 163 ends the call in the room before the movement (step S306), and proceeds to step S307.

In a case where a call has been started in a room after the movement (step S307, Yes), the calling unit 163 proceeds to step S302. On the other hand, in a case where a call has not been started in the room after the movement (step S307, No), the calling unit 163 proceeds to step S301.

Next, effects of the data processing device 100 according to Example 1 will be described. The data processing device 100 creates the space information 151 imitating an office environment having a plurality of rooms, and displays an office UI on which a plurality of icons corresponding to a plurality of users is arranged in the plurality of rooms on the basis of instruction information received from each of the terminal devices 10 used by the plurality of users. For each room in which a plurality of icons is displayed on the office UI, the data processing device 100 establishes a call by connecting a plurality of terminal devices 10 corresponding to a plurality of icons displayed in the same room.

As described above, the data processing device 100 displays the office UI on which the icons corresponding to the plurality of users is arranged, so that it is possible to virtually provide one space where users in spaces separated in reality exist together. Furthermore, since a call is established on the basis of icons arranged in the same room, it is possible to perform realistic communication imitating an environment in which a plurality of users works in the same office.

In addition, since the data processing device 100 simply expresses the office space using the office UI, it is possible to realize a space in which users can recognize the presence of others and are not too conscious of the presence of others. As a result, the users can improve concentration while feeling a sense of unity caused by working together.

Example 2

Figure 12:
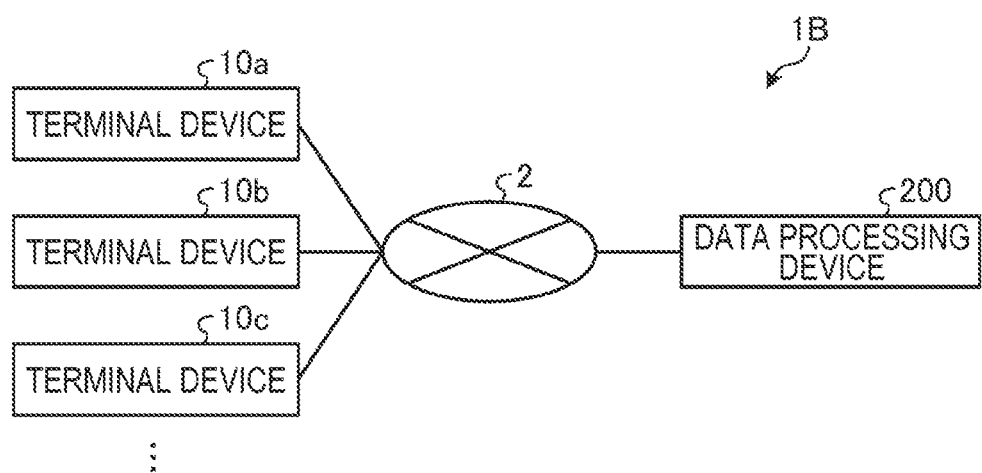
FIG. 12 is a diagram illustrating a configuration of a system according to Example 2.

Next, Example 2 will be described. FIG. 12 is a diagram illustrating a configuration of a system according to Example 2. As illustrated in FIG. 12, a system 1B includes terminal devices 10a, 10b, and 10c and a data processing device 200. Although the terminal devices 10a to 10c and the data processing device 200 are illustrated in the system 1B, the system 1B may further include another terminal device and another data terminal device.

The description regarding the terminal devices 10a to 10c is similar to the description in Example 1. The terminal devices 10a to 10c and another terminal device are collectively referred to as terminal devices 10 unless otherwise specified.

The terminal devices 10 and the data processing device 100 are connected to each other via a network 2.

The data processing device 200 acquires information on users by using devices such as cameras or microphones provided in the terminal devices 10, and specifies the current states of the users. The data processing device 200 displays the specified states of the users on an office UI, reflects the states in real time, and thus can provide, on the office UI as a virtual space, information equivalent to that in a real office for the users.

Figure 13:
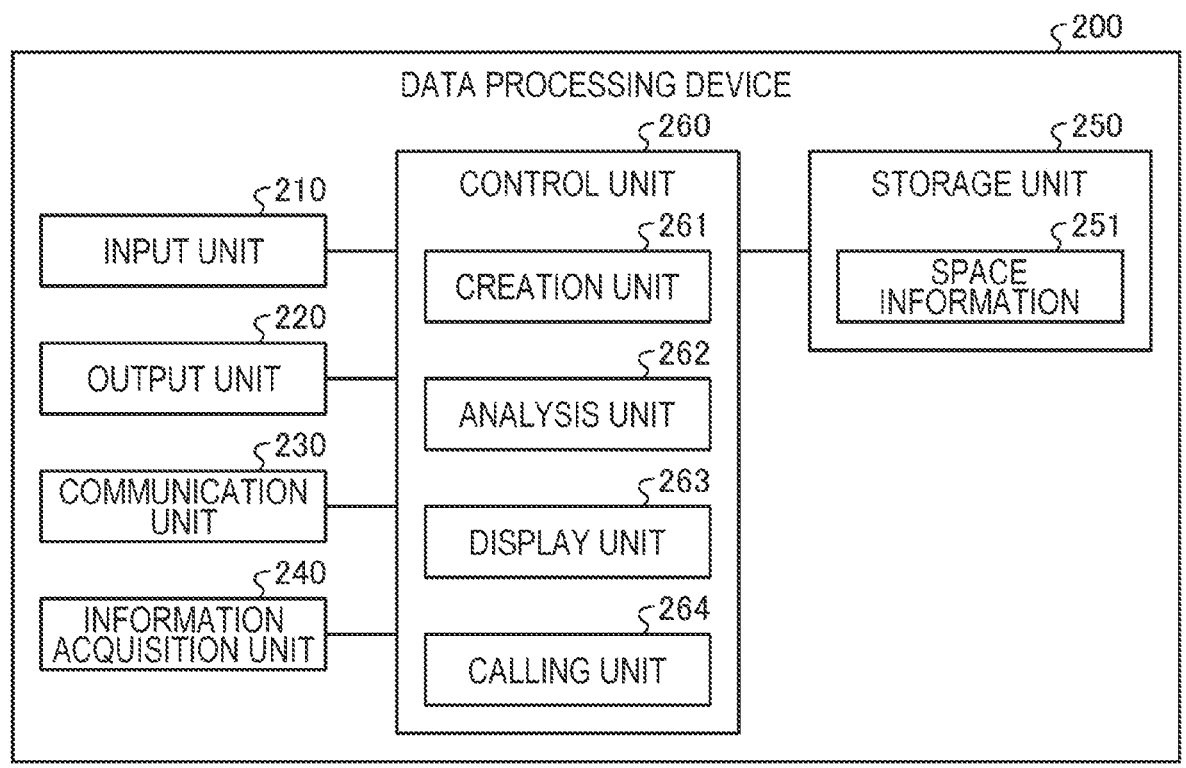
FIG. 13 is a functional block diagram illustrating a configuration of a data processing device according to Example 2.

FIG. 13 is a functional block diagram illustrating a configuration of the data processing device according to Example 2. As illustrated in FIG. 13, the data processing device 200 includes an input unit 210, an output unit 220, a communication unit 230, an information acquisition unit 240, a storage unit 250, and a control unit 260.

The description regarding the input unit 210, the output unit 220, and the communication unit 230 is similar to the description regarding the input unit 110, the output unit 120, and the communication unit 130 described in Example 1.

The information acquisition unit 240 acquires, from each of the terminal devices 10, video information captured by a camera of each of the terminal devices 10 and voice information collected by a microphone of each of the terminal devices 10. Furthermore, the information acquisition unit 240 further acquires, from each of the terminal devices 10, information on the status of user's operation of each of the terminal devices 10. The information acquisition unit 240 outputs the video information, the voice information, and the operation status information to the control unit 260. It is assumed that the video information, the voice information, and the operation status information are provided with identification information for identifying the terminal devices and users.

The storage unit 250 is implemented by a semiconductor memory element such as a RAM or a flash memory, or a storage device such as a hard disk or an optical disk. In Example 2, the storage unit 250 stores space information 251.

The description regarding the space information 251 is similar to the description regarding the space information 151 described in Example 1. For example, the office UI 151a described in FIG. 3 is displayed on the basis of the space information 251.

The control unit 260 is implemented by use of a CPU or the like, and executes a processing program stored in a memory. As a result, the control unit 260 functions as a creation unit 261, an analysis unit 262, a display unit 263, and a calling unit 264.

The creation unit 261 executes processing of creating the space information 251. For example, the creation unit 261 creates the space information 251 on the basis of input information of an administrator who operates the input unit 210. Other descriptions regarding the creation unit 261 are similar to the descriptions regarding the creation unit 161 in Example 1.

The analysis unit 262 analyzes the situations of the users on the basis of the video information, the voice information, and the operation status information received from the terminal devices 10, and classifies the situations of the users into several states (being present, being away from his/her seat, having a conversation, or the like). For example, the analysis unit 262 specifies whether a user is present or away from his/her seat in real time from the video information by using an image recognition technique. The analysis unit 262 specifies that a user is, for example, in a call, in a conference, or having a conversation in real time from the voice information by using a voice recognition technique. The analysis unit 262 specifies whether or not a user is performing work on the basis of the operation status information.

Incidentally, for users who are in an office, while classifying the situations of the users into several states by performing the above analysis, the analysis unit 262 acquires information on the current positions of the users from the terminal devices 10 of the users. The analysis unit 262 determines whether or not each user is in the office by using information of a pedometer of each of the terminal devices 10 or information on link states of wireless communication (strength of radio waves communicating with Wi-Fi, Bluetooth, or another wireless device, quality of signals and links, or the like) between the terminal devices 10 and devices installed on desks in the office. In a case where a user is in the office, the analysis unit 262 estimates the moving position of the user and specifies the current position of the user.

Each user may wear a sensor capable of specifying a position by an image, a radio wave, or the like as necessary, and the analysis unit 262 may acquire information from the sensor to specify the current position of each user.

In a case where a plurality of users is in the same space, the analysis unit 262 may further specify not only the state of a user of one terminal device 10 but also the state of another user on the basis of video information and voice information transmitted from the terminal device 10. For example, the analysis unit 262 can acquire the states of the users more accurately by specifying the state and the current position of the another user included in the video information.

The processing of specifying the states of the users by the analysis unit 262 described above is an example, and the states of the users may be specified by other techniques.

For users who are not in the office, the analysis unit 262 executes the above processing to output, to the display unit 263, user state information in which the states of the users and identification information are associated with each other. On the other hand, for users who are in the office, the analysis unit 262 outputs, to the display unit 263, user state information in which the state of the users, the current positions of the users, and identification information are associated with each other.

When receiving instruction information from the terminal devices 10, the display unit 263 arranges icons corresponding to the users (teleworking users) on the office UI 151a on the basis of the instruction information, similarly to the display unit 162 described in Example 1. Furthermore, the display unit 263 arranges icons of the users (users who are in the office) on the office UI 151a on the basis of the current positions included in the user state information. The display unit 263 transmits information on the office UI 151a on which the icons are arranged to the terminal devices 10 to display the information.

Figure 14:
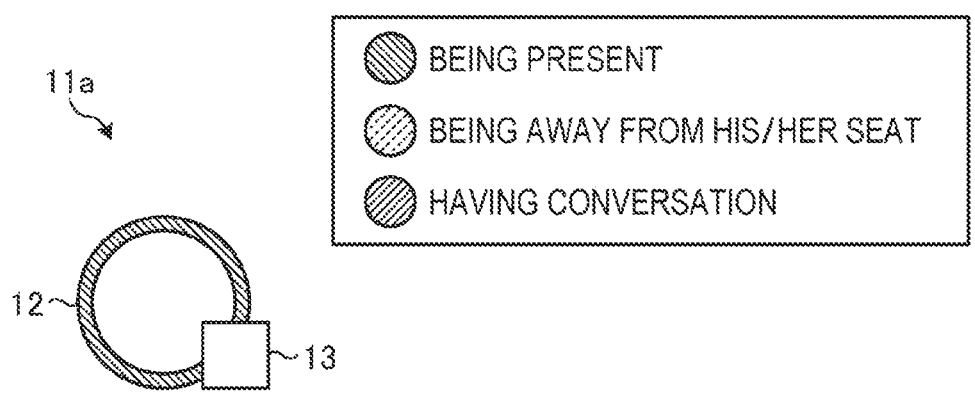
FIG. 14 is a diagram illustrating an example of an icon representing the state of a user.

Here, the display unit 263 displays the state of each user by a color, mark, blinking, movement, sound, or the like of an icon on the basis of the user state information acquired from the analysis unit 262. FIG. 14 is a diagram illustrating an example of an icon representing the state of a user. Here, the description will be made using an icon 11a of a user A of the terminal device 10a. The display unit 263 changes the color of a frame 12 of the icon 11a on the basis of the state of the user A. For example, the color of the frame 12 is displayed in a first color in a case where the user A is present, displayed in a second color in a case where the user A is away from his/her seat, and displayed in a third color in a case where the user A is having a conversation.

Furthermore, the display unit 263 provides a mark 13 to the icon 11a on the basis of whether or not the user A is in the office. For example, the display unit 263 provides the mark 13 in a case where the user A is in the office. Note that the display unit 263 may classify the users of the icons arranged on the office UI 151a into an office work group and a telework group according to the work situations of the users, and provide the mark 13 in a case where the user A belongs to a minority group.

Furthermore, the display unit 263 may display a name, image, illustration, or the like of the user in the icon 11a. It is assumed that the name, image, illustration, or the like of the user is stored in the storage unit 250 in association with identification information.

Figure 15:
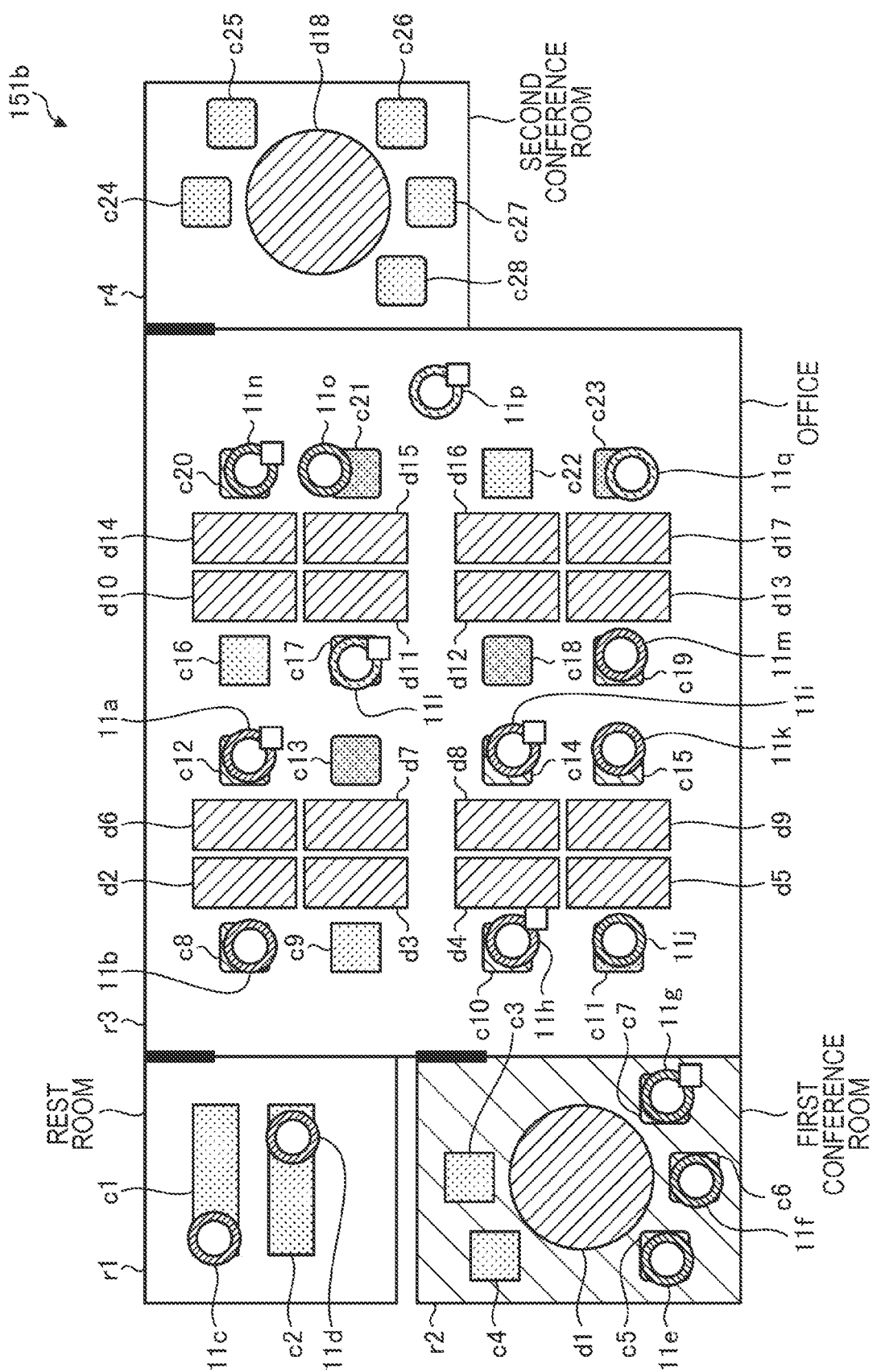
FIG. 15 is a diagram for describing processing of a display unit according to Example 2.

FIG. 15 is a diagram for describing processing of the display unit according to Example 2. As illustrated in FIG. 15, icons 11a to 11q are arranged on an office UI 151b. For example, the color of the frames of the icons 11a, 11b, 11c, 11d, 11h, 11i, 11k, and 11m is the first color, and thus indicates that the users corresponding to the icons are present. The color of the frames of the icons 11l, 11p, and 11q is the second color, and thus indicates that the users corresponding to the icons are away from their seats. The color of the frames of the icons 11e, 11f, 11g, 11j, 11n, and 11p is the third color, and thus indicates that the users corresponding to the icons are away from their seats.

In addition, the display unit 263 provides a mark to each of the icons 11a, 11g, 11h, 11i, 11l, 11n, and 11p. For example, if the user of the icon 11a is teleworking, it is indicated that the users of the icons 11a, 11g, 11h, 11i, 11l, 11n, and 11p each provided with the mark are teleworking.

The display unit 263 may distinguishably display presence and absence of the users by changing the color of chairs. Furthermore, the display unit 263 may highlight the color of a room to indicate that the room is being used.

The display unit 263 outputs information regarding the positions of the icons of the users on the office UI 151b to the calling unit 264 while executing the above processing according to instruction information from the terminal devices 10. For example, it is assumed that identification information of the users and the terminal devices is associated with the icons.

The description returns to FIG. 13. The calling unit 264 specifies a set of terminal devices 10 to establish a call on the basis of the information acquired from the display unit 263, and establishes the call between the specified terminal devices 10. For example, the calling unit 264 scans each room, specifies rooms in each of which a plurality of icons is arranged, and starts a call for each room in which a plurality of icons is arranged. Other descriptions regarding the calling unit 264 are similar to the descriptions regarding the calling unit 163 described in Example 1.

Figure 16:
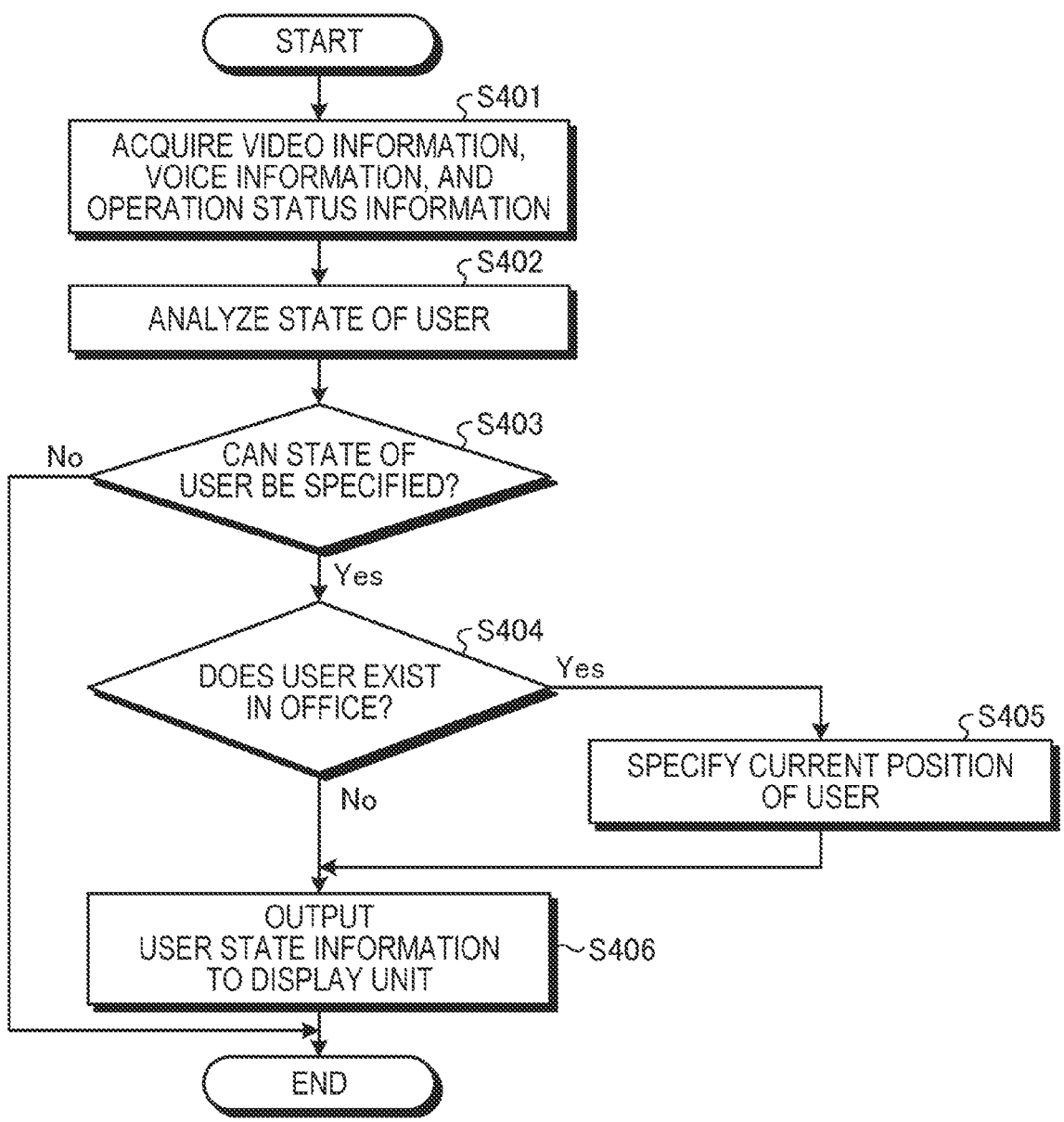
FIG. 16 is a flowchart illustrating a processing procedure of an analysis unit according to Example 2.

Next, an example of a processing procedure of the analysis unit 262 according to Example 2 will be described. FIG. 16 is a flowchart illustrating the processing procedure of the analysis unit according to Example 2. As illustrated in FIG. 16, the analysis unit 262 of the data processing device 200 acquires video information, voice information, and operation status information from one terminal device 10 via the information acquisition unit 240 (step S401).

The analysis unit 262 analyzes the state of a user on the basis of the video information, the voice information, and the operation status information (step S402). In a case where the state of the user cannot be specified (step S403, No), the analysis unit 262 ends the processing.

On the other hand, in a case where the state of the user can be specified (step S403, Yes), the analysis unit 262 determines whether or not the user exists in an office (step S404). In a case where the user does not exist in the office (step S404, No), the analysis unit 262 proceeds to step S406.

On the other hand, in a case where the user exists in the office (step S404, Yes), the analysis unit 262 specifies the current position of the user from the information of the terminal device 10 obtained via the information acquisition unit 240 (step S405). The analysis unit 262 outputs the user state information to the display unit 263 (step S406).

Incidentally, the processing of the analysis unit 262 described with reference to FIG. 16 is an example. In a case where the user is not in the office, the analysis unit 262 may fix the current position of the user at a fixed position set for each user. Furthermore, the analysis unit 262 may fix the current position of the user at a position on the office UI corresponding to a place where the user is likely to perform work in a case where the actual office is assumed, such as in front of a desk to which no user is assigned. As in Example 1, the user may designate the current position on the office UI.

Here, the display unit 263 displays the office UI on the basis of the user state information, but may reflect only the state of the user on the icon without reflecting the current position of the user except for movement by an operation of the user and movement associated with a conference or a conversation. The display unit 263 may estimate whereabouts of the user corresponding to a case where the user is in the office from the information specified by the analysis unit 262 and reflect the estimated whereabouts on the office UI.

Next, effects of the data processing device 200 according to Example 2 will be described. The data processing device 200 acquires video information, voice information, and operation status information from the terminal devices 10, specifies the states of users, and displays icons with colors, marks, or the like corresponding to the specified states. Furthermore, the current positions of the users are estimated and arranged on an office UI. As a result, users can easily grasp the state and current position of another user on the office UI.

Furthermore, according to the data processing device 200, information such as the position and state of another person, which can be acquired in a real space, can be acquired even in a virtual space. Furthermore, not showing the user's own figure or a video of the user's home makes it possible to reduce the stress of the user.

Example 3

Figure 17:
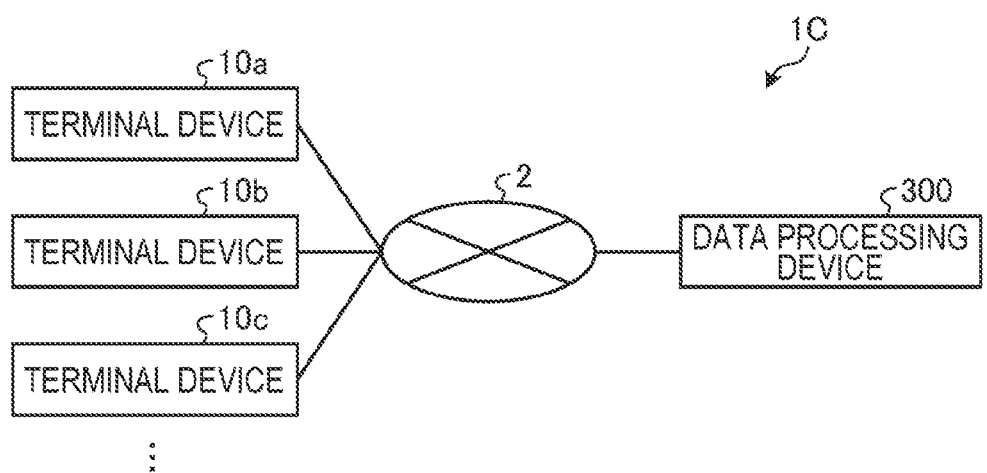
FIG. 17 is a diagram illustrating a configuration of a system according to Example 3.

Next, Example 3 will be described. FIG. 17 is a diagram illustrating a configuration of a system according to Example 3. As illustrated in FIG. 17, a system 1C includes terminal devices 10a, 10b, and 10c and a data processing device 300. Although the terminal devices 10a to 10c and the data processing device 300 are illustrated in the system 1C, the system 1C may further include another terminal device and another data terminal device.

The description regarding the terminal devices 10a to 10c is similar to the description in Example 1. The terminal devices 10a to 10c and another terminal device are collectively referred to as terminal devices 10 unless otherwise specified.

The terminal devices 10 and the data processing device 300 are connected to each other via a network 2.

In addition to the processing of the data processing device 200 in Example 2, the data processing device 300 analyzes voice information and truncates and visualizes information on the basis of the analyzed voice contents, thereby making it possible to enhance communication in a virtual space.

Figure 18:
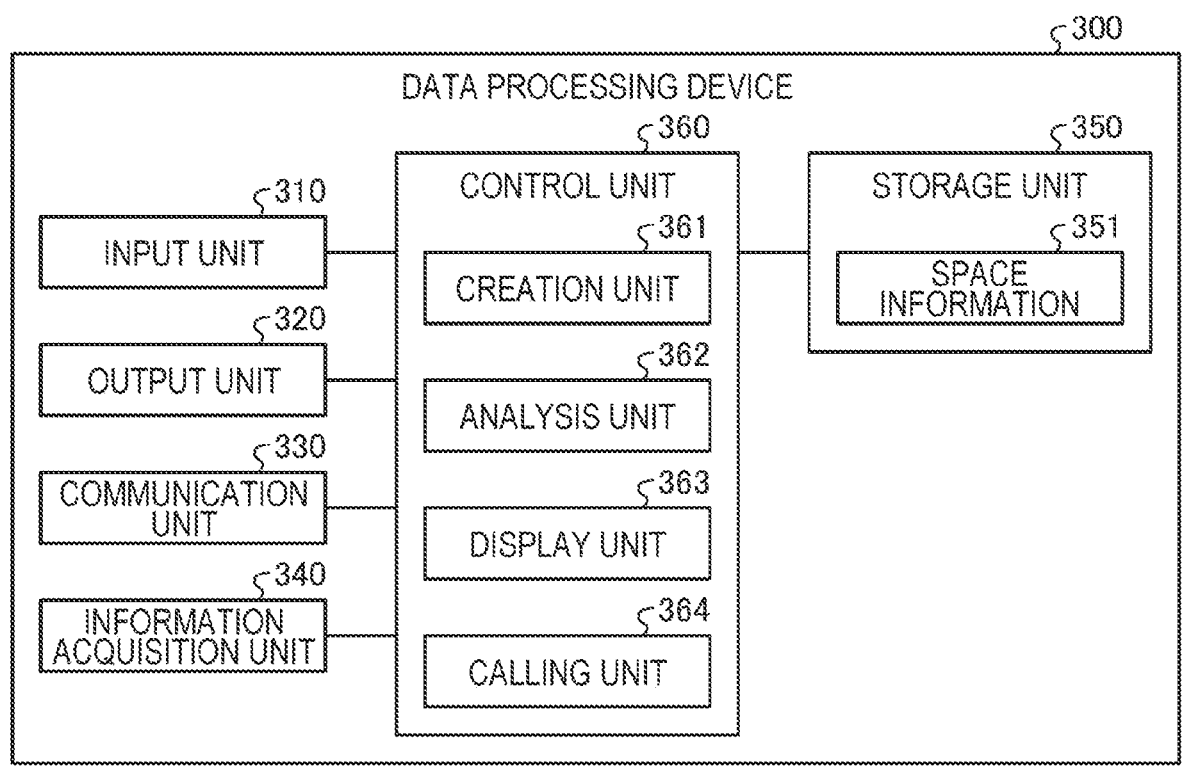
FIG. 18 is a functional block diagram illustrating a configuration of a data processing device according to Example 3.

FIG. 18 is a functional block diagram illustrating a configuration of the data processing device according to Example 3. As illustrated in FIG. 18, the data processing device 300 includes an input unit 310, an output unit 320, a communication unit 330, an information acquisition unit 340, a storage unit 350, and a control unit 360.

The description regarding the input unit 310, the output unit 320, and the communication unit 330 is similar to the description regarding the input unit 110, the output unit 120, and the communication unit 130 described in Example 1.

The information acquisition unit 340 acquires, from each of the terminal devices 10, video information captured by a camera of each of the terminal devices 10 and voice information collected by a microphone of each of the terminal devices 10. Furthermore, the information acquisition unit 340 further acquires, from each of the terminal devices 10, information on the status of user's operation of each of the terminal devices 10. The information acquisition unit 340 outputs the video information, the voice information, and the operation status information to the control unit 360. It is assumed that the video information, the voice information, and the operation status information are provided with identification information for identifying the terminal devices and users.

The storage unit 350 is implemented by a semiconductor memory element such as a RAM or a flash memory, or a storage device such as a hard disk or an optical disk. In Example 3, the storage unit 350 stores space information 251.

The description regarding the space information 351 is similar to the description regarding the space information 151 described in Example 1. For example, the office UIs 151a and 151b described with reference to FIGS. 3 and 15 are displayed on the basis of the space information 351.

The control unit 360 is implemented by use of a CPU or the like, and executes a processing program stored in a memory. As a result, the control unit 360 functions as a creation unit 361, an analysis unit 362, a display unit 363, and a calling unit 364.

The creation unit 361 executes processing of creating the space information 351. For example, the creation unit 361 creates the space information 351 on the basis of input information of an administrator who operates the input unit 310. Other descriptions regarding the creation unit 361 are similar to the descriptions regarding the creation unit 161 in Example 1.

The analysis unit 362 analyzes contents of an utterance or a conversation for the voice information acquired by the information acquisition unit 240 by using voice and conversation analysis techniques.

The analysis unit 362 specifies the contents of the utterance or the conversation and extracts characteristic words on the basis of the analysis result of the utterance and the conversation. Furthermore, the analysis unit 362 determines whether or not to convey the specified contents of the utterance or the conversation to another user. For example, is a case where the utterance contents correspond to a monologue, a telephone call with a person outside the company, a conversation with a person unrelated to work, or the like, the analysis unit 362 determines that the utterance is a voice that is not to be conveyed to surrounding users. Furthermore, in a case where a conversation by a plurality of users has contents regarding work related to only some users, the analysis unit 362 determines that the conversation is a voice that is not to be conveyed to users other than the users related to the work.

The analysis unit 362 determines whether or not to convey the contents of the utterance or the conversation to another user on the basis of a table defining contents of an utterance or a conversation that are not to be conveyed to another user. The analysis unit 362 uses a table defining the identification information of the users, the relationship with departments to which the users belong, and contents of utterances specific to the departments to specify a voice that is not to be conveyed to users other than the users related to the work.

The analysis unit 362 outputs the contents of the analyzed voice information and the determination result (determination result as to whether or not to convey the contents to another user) to the display unit 363 and the calling unit 364. Although the description is omitted, the analysis unit 362 may specify the states of the users on the basis of the video information, the voice information, and the operation information, and output the states to the display unit 363, similarly to the analysis unit 262 in Example 2.

The display unit 363 adjusts the positions of icons on the office UI on the basis of the contents of the voice information and the determination result acquired from the analysis unit 362. For example, in a case where the voice information received from the terminal devices 10 is a conversation about work related to only some users, the display unit 363 moves the positions of the icons of the users in the conversation to another room. As a result, the rooms are separated, and thus adjustment is performed such that a user unrelated to the conversation about the work cannot hear the voice (the calling unit 364 described later establishes a call between terminal devices corresponding to icons in the same room).

In a case where icons of users having a conversation about other work are arranged in the room in which the icons of the users have been moved and there is no remaining room, the display unit 363 automatically generates a temporary room and moves the icons of the users to the room. Furthermore, in a case where only a part of the users having the conversation uses a conference room or the like in an actual office, the display unit 363 may move other users to the automatically generated room.

In a case where the users having the conversation are actually in the office, the display unit 363 may temporarily ignore the actual positions of the users, move the current positions on the office UI, and return the icons to the actual current positions of the users at the end of the conversation.

Figure 19:
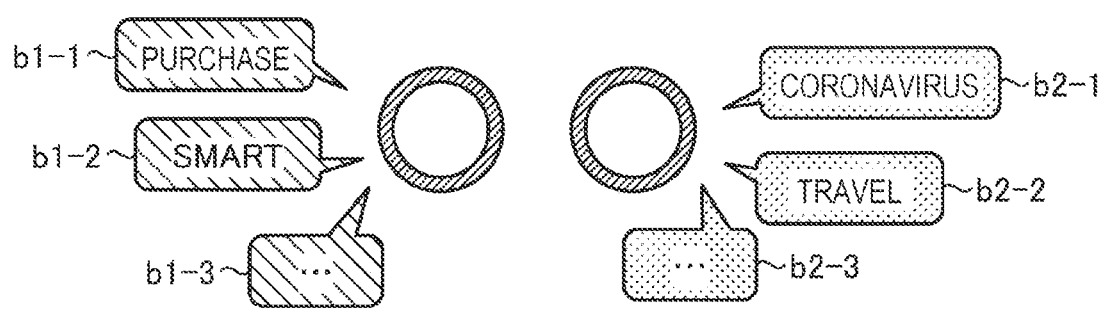
FIG. 19 is a diagram illustrating an example of visualization of conversation contents on an office UI.

Furthermore, the display unit 363 visualizes the contents of the conversation and the characteristic words acquired from the analysis unit 362 on the office UI. FIG. 19 is a diagram illustrating an example of visualization of conversation contents on the office UI. As illustrated in FIG. 19, the conversation contents are indicated by speech balloons or the like near users in a conversation. The display unit 363 distinguishably displays genres or the like of topics (a topic related to work and a topic related to general news) according to the color, shape, or the like of each speech balloon.

The display unit 363 represents the characteristic words in the conversation with words in the speech balloons. In FIG. 19, for example, speech balloons b1-1, b1-2, and b-3 are speech balloons related to work, and speech balloons b2-1, b2-2, and b2-3 are speech balloons related to characteristic words. When the display unit 363 executes such processing, it is possible to listen to a conversation being held at a distant place and acquire information (to understand the contents of the conversation by speech balloons on the office UI even if voice information cannot be actually heard). In addition, since the display unit 353 does not display all pieces of voice information as speech balloons and displays only topics related to work, topics related to news, and characteristic words, it is possible to reduce discomfort associated with being heard of a conversation.

Although the description is omitted, the display unit 363 may visually reflect the state of a user on an icon, similarly to the display unit 263 in Example 2.

The calling unit 364 specifies a set of terminal devices 10 to establish a call on the basis of the information acquired from the display unit 363, and establishes the call between the specified terminal devices 10. For example, the calling unit 364 scans each room, specifies rooms in each of which a plurality of icons is arranged, and starts a call for each room in which a plurality of icons is arranged.

Here, the calling unit 364 controls transmission and reception of voice information between the terminal devices on the basis of the information acquired from the analysis unit 362. For example, in a case where a call is established between the terminal devices 10*a* and 10*b*, the calling unit 364 temporarily stops transmission of voice information from the terminal device 10*a* to the terminal device 10*b* while the voice information of the terminal device 10*a* is determined to be voice information that is not to be conveyed to another user. Thereafter, in a case where the voice information of the terminal device 10*a* is determined to be voice information to be conveyed to another user, the calling unit 364 resumes transmission of the voice information.

Figure 20:
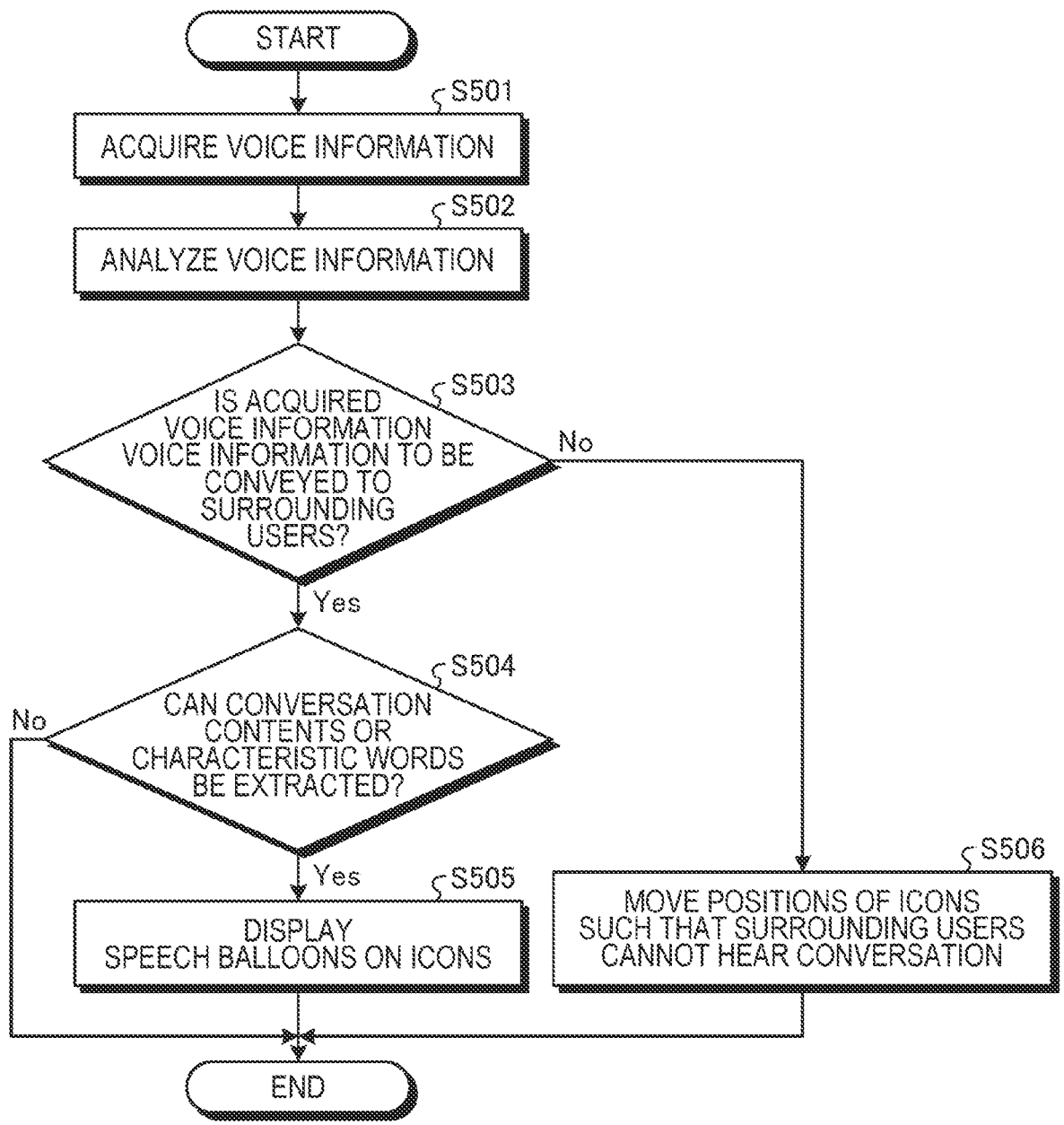
FIG. 20 is a flowchart illustrating a processing procedure of the data processing device according to Example 3.

Next, an example of a processing procedure of the data processing device 300 according to Example 3 will be described. FIG. 20 is a flowchart illustrating the processing procedure of the data processing device according to Example 3. As illustrated in FIG. 20, the analysis unit 362 of the data processing device 300 acquires voice information (step S501).

The analysis unit 362 analyzes the voice information (step S502). In a case where the acquired voice information is voice information to be conveyed to surrounding users (step S503, Yes), the analysis unit 362 proceeds to step S504. On the other hand, in a case where the acquired voice information is not voice information to be conveyed to surrounding users (step S503, No), the analysis unit 362 proceeds to step S506.

In a case where conversation contents or characteristic words cannot be extracted (step S504, No), the analysis unit 362 ends the processing. On the other hand, in a case where conversation contents or characteristic words can be extracted (step S504, Yes), the analysis unit 362 proceeds to step S505.

The display unit 363 of the data processing device 300 displays speech balloons on icons (step S505). Note that the display unit 363 moves the positions of the icons such that surrounding users cannot hear the conversation (step S506).

Next, effects of the data processing device 300 according to Example 3 will be described. The data processing device 300 analyzes voice information, determines whether or not the voice information is necessary for another user, and performs adjustment such that voice information determined to be unnecessary is not to be transmitted, thereby eliminating a factor that hinders concentration.

In addition, the data processing device 300 analyzes the voice information and extracts information such as conversation contents and characteristic words. Visualizing these pieces of information on an office UI makes it possible to acquire information regarding a conversation being held at a place distant from a user. As a result, it is easy to join a conversation being held at a distant place, and it is possible to increase opportunities for communication.

Example 4

Figure 21:
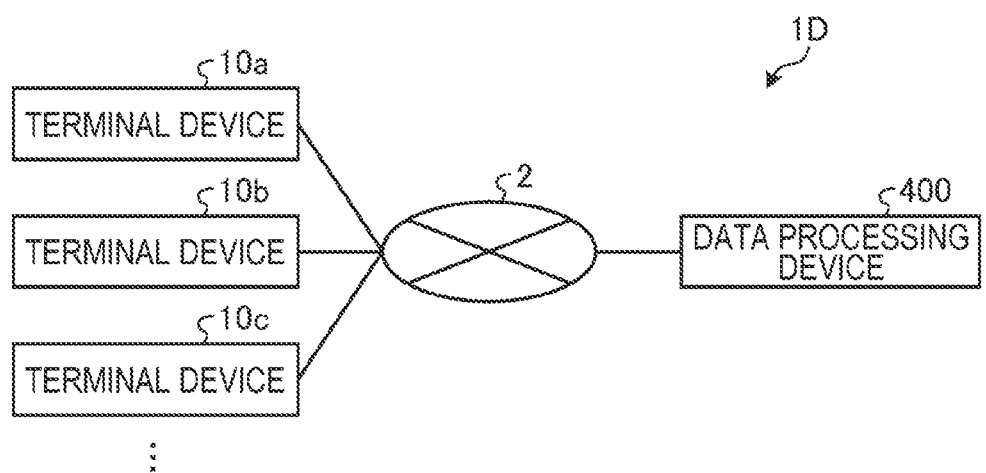
FIG. 21 is a diagram illustrating a configuration of a system according to Example 4.

Next, Example 4 will be described. FIG. 21 is a diagram illustrating a configuration of a system according to Example 4. As illustrated in FIG. 21, a system 1D includes terminal devices 10*a*, 10*b*, and 10*c* and a data processing device 400. Although the terminal devices 10*a* to 10*c* and the data processing device 400 are illustrated in the system 1D, the system 1D may further include another terminal device and another data terminal device.

The description regarding the terminal devices 10*a* to 10*c* is similar to the description in Example 1. The terminal devices 10*a* to 10*c* and another terminal device are collectively referred to as terminal devices 10 unless otherwise specified.

The terminal devices 10 and the data processing device 400 are connected to each other via a network 2.

The data processing device 400 adjusts how a voice is heard during a call on the basis of the distance between icons on an office UI or the volume of a speaker, thereby realizing a realistic conversation environment on a virtual space.

Furthermore, the data processing device 400 visualizes a voice environment during a call on the office UI, thereby enabling provision of a more comfortable conversation environment.

Figure 22:
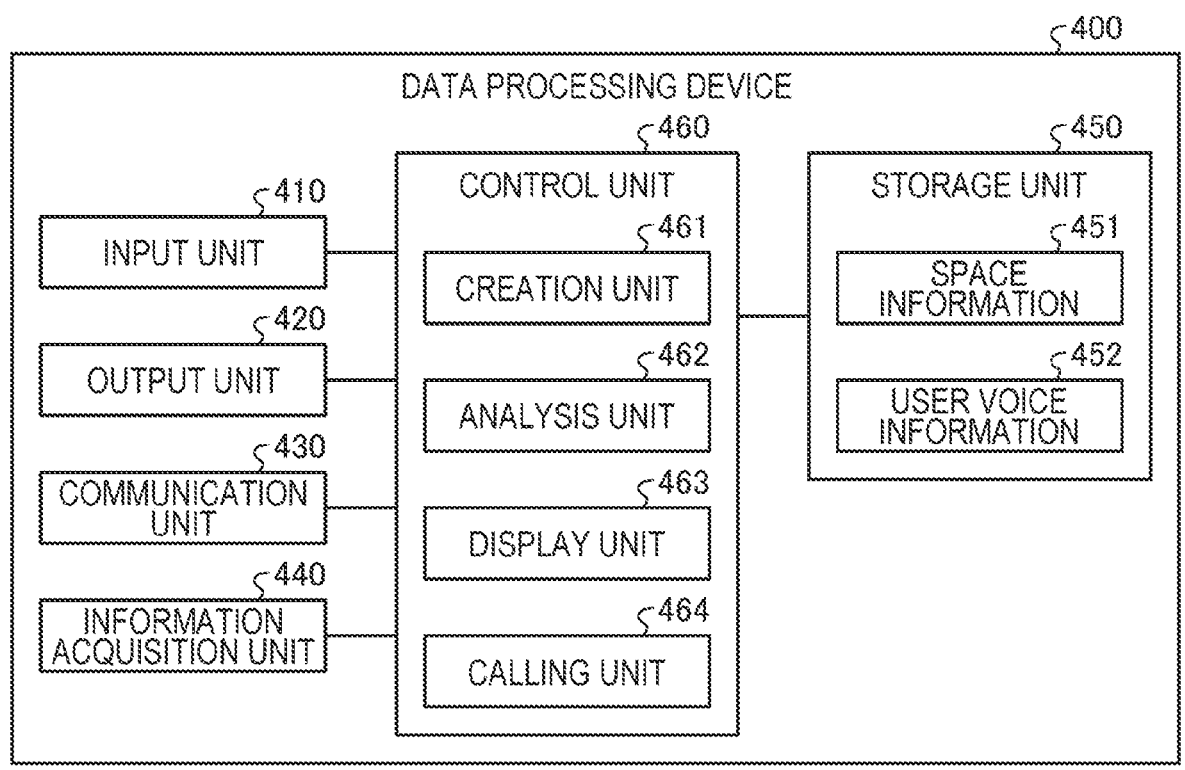
FIG. 22 is a functional block diagram illustrating a configuration of a data processing device according to Example 4.

FIG. 22 is a functional block diagram illustrating a configuration of the data processing device according to Example 4. As illustrated in FIG. 22, the data processing device 400 includes an input unit 410, an output unit 420, a communication unit 430, an information acquisition unit 440, a storage unit 450, and a control unit 460.

The description regarding the input unit 410, the output unit 420, and the communication unit 430 is similar to the description regarding the input unit 110, the output unit 120, and the communication unit 130 described in Example 1.

The information acquisition unit 440 acquires, from each of the terminal devices 10, video information captured by a camera of each of the terminal devices 10 and voice information collected by a microphone of each of the terminal devices 10. Furthermore, the information acquisition unit 440 further acquires, from each of the terminal devices 10, information on the status of user's operation of each of the terminal devices 10. The information acquisition unit 440 outputs the video information, the voice information, and the operation status information to the control unit 460. It is assumed that the video information, the voice information, and the operation status information are provided with identification information for identifying the terminal devices and users.

The storage unit 450 is implemented by a semiconductor memory element such as a RAM or a flash memory, or a storage device such as a hard disk or an optical disk. In Example 4, the storage unit 450 stores space information 451 and user voice information 452.

The description regarding the space information 451 is similar to the description regarding the space information 151 described in Example 1. For example, the office UIs 151a and 151b described with reference to FIGS. 3 and 15 are displayed on the basis of the space information 451.

The user voice information 452 includes information on the volume of each user during a normal conversation, an attribute given according to work contents of each user, and the like, which are registered in advance. For example, the user voice information 452 associates a volume during a conversation with an attribute by using the identification information of each user. The attribute corresponds to a department to which each user belongs or the like.

The control unit 460 is implemented by use of a CPU or the like, and executes a processing program stored in a memory. As a result, the control unit 460 functions as a creation unit 461, an analysis unit 462, a display unit 463, and a calling unit 464.

The creation unit 461 executes processing of creating the space information 451. For example, the creation unit 461 creates the space information 451 on the basis of input information of an administrator who operates the input unit 410. Other descriptions regarding the creation unit 461 are similar to the descriptions regarding the creation unit 161 in Example 1.

The analysis unit 462 analyzes contents of an utterance or a conversation on the basis of the voice information acquired by the information acquisition unit 440 and the user voice information 452. For example, the analysis unit 462 specifies a difference between a volume during a normal conversation and a volume of the voice information and an attribute of each user. For example, the analysis unit 462 may analyze closeness between the attributes of the users on the basis of a table defining closeness between a certain attribute and another attribute.

The analysis unit 462 outputs the analysis result to the display unit 463 and the calling unit 464. The analysis result includes the identification information of the users, the difference between the volume during the normal conversation and the volume of the voice information, and the closeness between the attributes of the users.

When receiving instruction information from the terminal devices 10, the display unit 463 arranges icons corresponding to users (teleworking users) on the office UI 151a on the basis of the instruction information, similarly to the display unit 162 described in Example 1. Furthermore, the display unit 463 may arrange icons of users (users who are in the office) on the office UI 151a on the basis of the current positions included in the user state information. The display unit 463 transmits information on the office UI 151a on which the icons are arranged to the terminal devices 10 to display the information.

The display unit 463 outputs distance information between the icons on the office UI 151a to the calling unit 464. For example, the distance information includes identification information of target users and information on the distance between the users.

The calling unit 464 adjusts a volume between terminal devices with which a call is established on the basis of the analysis result acquired from the analysis unit 462 and the distance information acquired from the display unit 463.

In a case where a call is established between the terminal device 10a of a user A and the terminal device 10b of a user B, and the distance of an icon of the user A and the distance of an icon of the user B are far from each other (in a case where the distance is equal to or greater than a threshold), the calling unit 464 performs control to reduce the voice of the user A output from the terminal device 10b. The calling unit performs control to reduce the voice of the user B output from the terminal device 10a.

In a case where the distance between the icon of the user A and the icon of the user B is smaller than the threshold, the distance between the icon of the user A and an icon of a user C is equal to or greater than the threshold, and the volume of the voice information of the user A is smaller than the volume of his/her normal conversation, the calling unit 464 controls the volume of the call as follows. The calling unit 464 performs adjustment to reduce a range in which the voice of the user can be heard. For example, in a case where the range after adjustment based on the position of the icon of the user A includes the icon of the user B and does not include the icon of the user C, the calling unit 464 causes the terminal device 10b of the user B to output the volume of the voice information of the user A with the normal volume, and does not output the voice information of the user A from the terminal device 10c of the user C.

Furthermore, in a case where the difference between the volume of the voice information of the user A and the volume of his/her normal conversation is small and the difference between the volume of the voice information of the user B and the volume of his/her normal conversation is small, the calling unit 464 may adjust the voice of the user A and the voice of the user B output from the terminal devices 10 to the same volume. That is, the calling unit 464 causes the terminal devices 10 to output a voice with a constant volume regardless of individual differences in volume of voice.

The calling unit 464 may adjust the volume of a voice or cut the voice according to work related to a user. For example, an attribute is given to a user according to work contents of the user, the volume is slightly lowered in a case where an attribute of another user having a conversation nearby is slightly different, and the voice is cut in a case where the attribute is greatly different. The calling unit 464 may acquire information regarding closeness between the attributes of the users from the analysis unit 462, or may control the call on the basis of a table in which a combination of attributes of users and contents of control of a call (lowering a volume, cutting a voice, or the like) are associated with each other.

The calling unit 464 outputs information regarding a voice received by a partner of the call to the analysis unit 462.

Here, in addition to the above processing, the analysis unit 462 acquires the information regarding the voice received by the partner of the call from the calling unit 464, analyzes quality such as clarity, intelligibility, and presence or absence of delay on the basis of the acquired information using a voice quality evaluation technique or a conversation analysis technique, and outputs the analysis result to the display unit 463.

Figure 23:
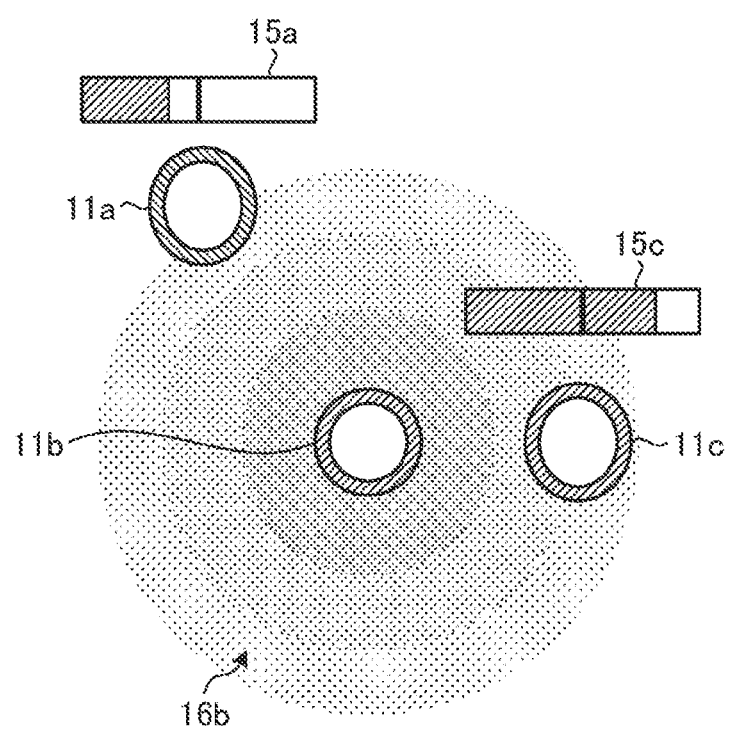
FIG. 23 is a diagram for describing processing of a display unit according to Example 4.

In addition to the above processing, the display unit 463 visually displays a call status on the office UI on the basis of the analysis result (quality of the voice) output from the analysis unit 462 and the information regarding the users. FIG. 23 is a diagram for describing processing of the display unit according to Example 4.

As illustrated in FIG. 23, when a user is being generated, the display unit 463 draws concentric circles and displays a range in which the voice of the user is heard and the volume of the voice. FIG. 23 illustrates an icon 11*a* corresponding to the user A, an icon 11*b* corresponding to the user B, and an icon 11*c* corresponding to the user C. Here, the user B is speaking, and a range in which the voice information of the user B can be heard is indicated by concentric circles 16*b*. Furthermore, the volume of the user B output from the terminal device 10*b* of the user A is indicated by a bar 15*a*, and the volume of the user B output from the terminal device 10*c* of the user C is indicated by a bar 15*c*. Since the distance between the icon 11*b* and the icon 11*c* is smaller than the distance between the icon 11*b* and the icon 11*a*, the display unit 463 displays the volume indicated by the bar 15*c* to be larger than the volume indicated by the bar 15*a*.

Figure 24:
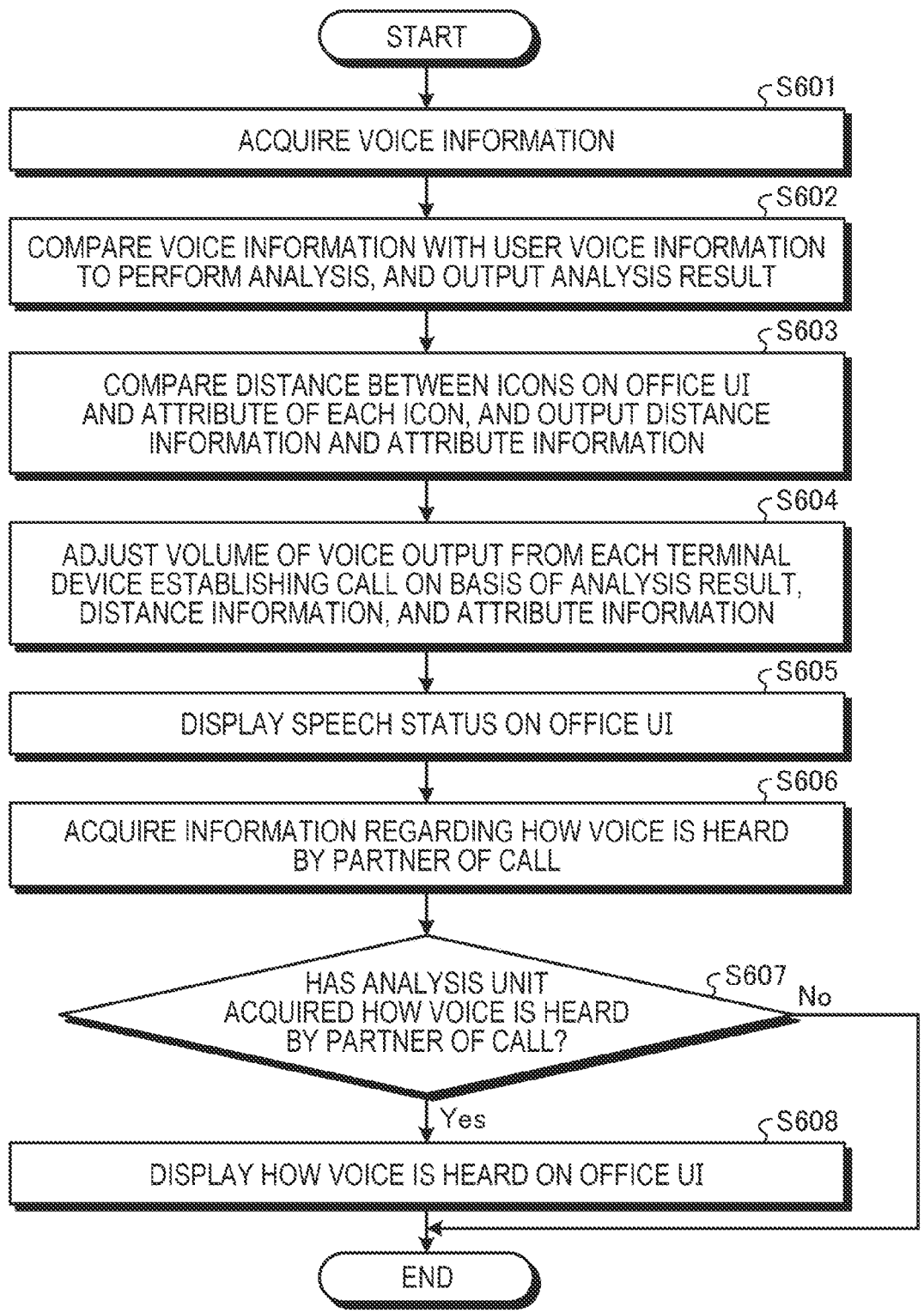
FIG. 24 is a flowchart illustrating a processing procedure of the data processing device according to Example 4.

Next, an example of a processing procedure of the data processing device 400 according to Example 4 will be described. FIG. 24 is a flowchart illustrating the processing procedure of the data processing device according to Example 4. As illustrated in FIG. 24, the analysis unit 462 of the data processing device 400 acquires voice information by using the information acquisition unit 440 (step S601).

The analysis unit 462 compares the voice information with the user voice information 452 to perform analysis, and outputs the analysis result to the calling unit 464 (step S602). The display unit 463 of the data processing device 400 compares the distance between icons on the office UI and an attribute of each icon, and outputs the distance information and the attribute information to the calling unit 464 (step S603).

The calling unit 464 of the data processing device 400 adjusts the volume of a voice output from each terminal device establishing a call on the basis of the analysis result, the distance information, and the attribute information (step S604). The display unit 463 displays a speech status on the office UI (step S605).

The analysis unit 462 acquires information regarding how the voice is heard by a partner of the call from the calling unit 464 (step S606). In a case where how the voice is heard by the partner of the call is not acquired (step S607, No), the analysis unit 462 ends the processing.

In a case where how the voice is heard by the partner of the call has been acquired (step S607, Yes), the analysis unit 462 proceeds to step S608. The display unit 463 displays how the voice is heard on the office UI (step S608).

Next, effects of the data processing device 400 according to Example 4 will be described. When establishing a call, the data processing device 400 adjusts a range in which the voice of a user is heard and the volume of the voice on the basis of the positions of users on the UI and the volume of the voice. As a result, a conversation environment on a virtual space is brought close to a real conversation environment, and comfortable communication is realized.

The data processing device 400 registers a normal voice and a volume of voice at the time of normal conversation for each user. On the basis of the registered information, the data processing device 400 can make a call at a constant volume regardless of individual differences in volume and visualize voice quality during a conversation on the office UI. Accordingly, provision of a comfortable conversation environment is realized.

Figure 25:
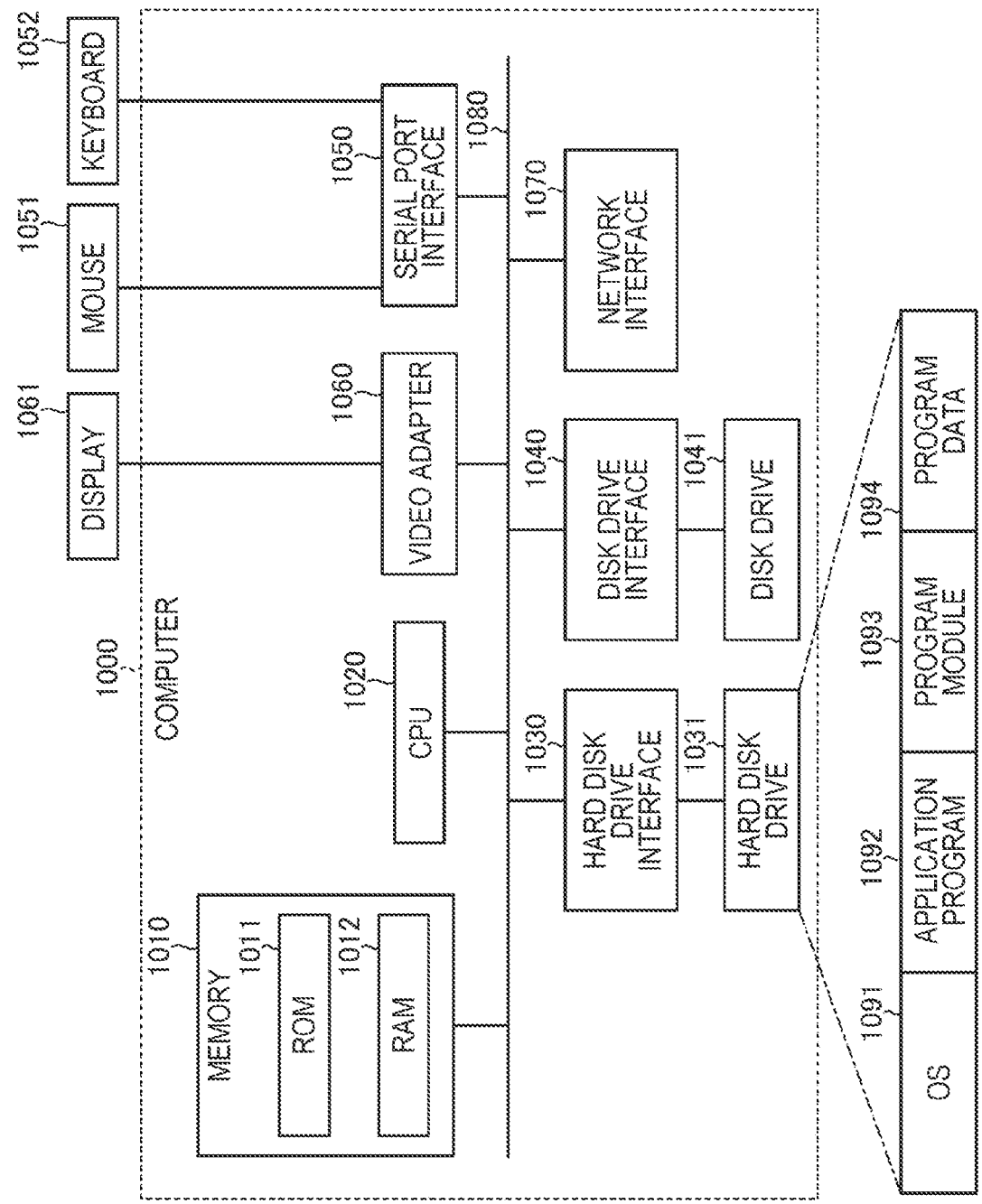
FIG. 25 is a diagram illustrating an example of a computer that executes a data processing program.

FIG. 25 is a diagram illustrating an example of a computer that executes a data processing program. A computer 1000 includes, for example, a memory 1010, a CPU 1020, a hard disk drive interface 1030, a disk drive interface 1040, a serial port interface 1050, a video adapter 1060, and a network interface 1070. These units are connected to each other by a bus 1080.

The memory 1010 includes a read only memory (ROM) 1011 and a RAM 1012. The ROM 1011 stores, for example, a boot program such as a basic input output system (BIOS). The hard disk drive interface 1030 is connected to a hard disk drive 1031. The disk drive interface 1040 is connected to a disk drive 1041. A removable storage medium such as a magnetic disk or an optical disk, for example, is inserted into the disk drive 1041. A mouse 1051 and a keyboard 1052, for example, are connected to the serial port interface 1050. A display 1061, for example, is connected to the video adapter 1060.

Here, the hard disk drive 1031 stores, for example, an OS 1091, an application program 1092, a program module 1093, and program data 1094. Each piece of information described in the above embodiments is stored in, for example, the hard disk drive 1031 or the memory 1010.

In addition, the data processing program is stored in the hard disk drive 1031 as, for example, the program module 1093 in which a command executed by the computer 1000 is described. Specifically, the program module 1093 in which each set of processing executed by the data processing device 100 (200, 300, or 400) described in the above embodiments is described is stored in the hard disk drive 1031.

In addition, data used for information processing by the data processing program is stored as the program data 1094, for example, in the hard disk drive 1031. The CPU 1020 then reads, into the RAM 1012, the program module 1093 and the program data 1094 stored in the hard disk drive 1031 as needed and executes each procedure described above.

Note that the program module 1093 and the program data 1094 related to the data processing program are not limited to being stored in the hard disk drive 1031, and may be stored in, for example, a removable storage medium and read by the CPU 1020 via the disk drive 1041 or the like. Alternatively, the program module 1093 and the program data 1094 related to the data processing program may be stored in another computer connected via a network such as a LAN or a wide area network (WAN) and read by the CPU 1020 via the network interface 1070.

Although the embodiments to which the invention made by the present inventor is applied have been described above, the present invention is not limited by the description and drawings constituting a part of the disclosure of the present invention according to the present embodiments. That is, other embodiments, examples, operation techniques, and the like made by those skilled in the art on the basis of the present embodiments are all included in the scope of the present invention.

REFERENCE SIGNS LIST

100, 200, 300, 400 Data processing device
110, 210, 310, 410 Input unit
120, 220, 320, 420 Output unit
130, 230, 330, 430 Communication unit
140, 240, 340, 440 Information acquisition unit
150, 250, 350, 450 Storage unit
151, 251, 351, 451 Space information
160, 260, 360, 460 Control unit
161, 261, 361, 461 Creation unit
162, 263, 363, 463 Display unit
163, 264, 364, 464 Calling unit
262, 362, 462 Analysis unit
452 User voice information

The invention claimed is:

1. A data processing device comprising a processor configured to execute operations comprising:
generating space information, wherein the space information imitates an office environment having a plurality of rooms;
displaying the space information, wherein the plurality of rooms in the imitated office environment include, based on instruction information from each of terminal devices used by a plurality of users, a plurality of icons corresponding to the plurality of users; and
establishing a call by connecting, for a room in which a plurality of icons is displayed in the space information, a plurality of terminal devices corresponding to the plurality of icons displayed in the room;
specifying states of the users based on user information, wherein the user information includes a combination including:
video information of the users,
voice information of the users, and
information on operation statuses of the terminal devices; and
displaying the states of the users on the plurality of icons corresponding to the plurality of users according to the user information
analyzing whether or not conversation contents correspond to predetermined conversation contents based on the voice information of the users; and
adjusting, based on the analyzed conversation contexts, positions of the plurality of icons.

2. The data processing device according to claim 1, wherein the displaying further comprises:
acquiring position information of a user existing in an office, and
placing an icon corresponding to the user existing in the office in the space information based on the acquired position information.

3. The data processing device according to claim 1, wherein the establishing the call further comprises:

adjusting a volume of a voice of each of the users corresponding to the plurality of terminal devices with which the call has been established based on a distance between the plurality of icons corresponding to the plurality of users.

4. The data processing device according to claim 3, wherein the displaying further comprises: visually displaying a result of the volume adjustment on each of the plurality of icons corresponding to the plurality of users.

5. A data processing method comprising:
generating space information, wherein the space information imitates an office environment having a plurality of rooms;
displaying the space information, wherein the plurality of rooms in the imitated office environment include, based on instruction information from each of terminal devices used by a plurality of users, plurality of icons corresponding to the plurality of users; and
establishing a call by connecting, for a room in which a plurality of icons is displayed in the space information, a plurality of terminal devices corresponding to the plurality of icons displayed in the room;
specifying states of the users based on user information, wherein the user information includes a combination including:
video information of the users,
voice information of the users, and
information on operation statuses of the terminal devices; and
displaying the states of the users on the plurality of icons corresponding to the plurality of users according to the user information;
analyzing whether or not conversation contents correspond to predetermined conversation contents based on the voice information of the users; and
adjusting, based on the analyzed conversation contexts, positions of the plurality of icons corresponding to the plurality of users.

6. A computer-readable non-transitory recording medium storing computer-executable program instructions that when executed by a processor cause a computer system to execute operations comprising:
generating space information, wherein the space information imitates an office environment having a plurality of rooms;
displaying the space information, wherein the plurality of rooms in the imitated office environment include, based on instruction information from each of terminal devices used by a plurality of users, a plurality of icons corresponding to the plurality of users; and
establishing a call by connecting, for a room in which a plurality of icons is displayed in the space information, a plurality of terminal devices corresponding to the plurality of icons displayed in the room;
specifying states of the users based on user information, wherein the user information includes a combination including:
video information of the users,
voice information of the users, and
information on operation statuses of the terminal devices; and
displaying the states of the users on the plurality of icons corresponding to the plurality of users according to the user information;
analyzing whether or not conversation contents correspond to predetermined conversation contents based on the voice information of the users; and adjusting, based on the analyzed conversation contexts, positions of the plurality of icons corresponding to the plurality of users.

7. The data processing method according to claim 5, further comprising:
   acquiring position information of a user existing in an office, and
   placing an icon corresponding to the user existing in the office in the space information based on the acquired position information.

8. The data processing method according to claim 5, further comprising:
   adjusting a volume of a voice of each of the users corresponding to the plurality of terminal devices with which the call has been established based on a distance between the plurality of icons corresponding to the plurality of users.

9. The data processing method according to claim 8, wherein the displaying further comprises: visually displaying a result of the volume adjustment on each of the plurality of icons corresponding to the plurality of users.

10. The computer-readable non-transitory recording medium according to claim 6, the computer-executable program instructions when executed further causing the computer system to execute operations comprising:
    acquiring position information of a user existing in an office, and
    placing an icon corresponding to the user existing in the office in the space information based on the acquired position information.

11. The computer-readable non-transitory recording medium according to claim 6, the computer-executable program instructions when executed further causing the computer system to execute operations comprising:
    adjusting a volume of a voice of each of the users corresponding to the plurality of terminal devices with which the call has been established based on a distance between the plurality of icons corresponding to the plurality of users.

12. The computer-readable non-transitory recording medium according to claim 11, wherein the displaying further comprises: visually displaying a result of the volume adjustment on each of the plurality of icons corresponding to the plurality of users.

* * * * *